United States Patent
Mori et al.

(10) Patent No.: US 11,297,192 B2
(45) Date of Patent: Apr. 5, 2022

(54) IMAGE PROCESSING SYSTEM FOR COMPUTERIZING DOCUMENT, CONTROL METHOD THEREOF, AND STORAGE MEDIUM

(71) Applicant: Canon Kabushiki Kaisha, Tokyo (JP)

(72) Inventors: Namihiro Mori, Kanagawa (JP); Hirofumi Mochizuki, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/153,101

(22) Filed: Jan. 20, 2021

(65) Prior Publication Data
US 2021/0227082 A1    Jul. 22, 2021

(30) Foreign Application Priority Data

Jan. 21, 2020    (JP) .............................. JP2020-007525

(51) Int. Cl.
*H04N 1/04* (2006.01)
*H04N 1/00* (2006.01)
*G06K 9/00* (2022.01)

(52) U.S. Cl.
CPC ..... *H04N 1/00331* (2013.01); *G06K 9/00463* (2013.01); *G06K 9/00483* (2013.01); *H04N 1/00766* (2013.01); *H04N 1/00771* (2013.01)

(58) Field of Classification Search
None
See application file for complete search history.

(56) References Cited

U.S. PATENT DOCUMENTS

| | | | |
|---|---|---|---|
| 8,760,687 B2* | 6/2014 | Son | H04N 1/00331 358/1.15 |
| 2015/0302277 A1* | 10/2015 | Suzuki | G06K 9/2081 382/229 |
| 2019/0065843 A1* | 2/2019 | Matsumoto | G06K 9/00469 |
| 2019/0087444 A1* | 3/2019 | Arakawa | G06F 40/174 |
| 2019/0102385 A1* | 4/2019 | Tokita | G06F 16/164 |
| 2019/0197305 A1* | 6/2019 | Kanada | G06K 9/6878 |

(Continued)

FOREIGN PATENT DOCUMENTS

| | | |
|---|---|---|
| EP | 3541057 A1 | 9/2019 |
| JP | 2019-159629 A | 9/2019 |

OTHER PUBLICATIONS

Extended European Search Report dated Jun. 9, 2021 in corresponding European Patent Appln. No. 21152292.5.

*Primary Examiner* — Dung D Tran
(74) *Attorney, Agent, or Firm* — Venable LLP

(57) ABSTRACT

In an image processing system in which when a paper document is computerized, a file name or the like is set by using a recognized character string obtained by performing OCR processing, so that time and effort of a user when a plurality of documents is computerized en bloc is reduced. Learning data is generated by registering positional information relating to a recognized character string used for setting of a property relating to a scanned image in association with a document form of the scanned image. Then, in a case where the learning data is generated in response to setting of the property being performed for a first scanned image that is selected from a plurality of scanned images included in a list, a scanned image having a document form similar to a document form of the first scanned image is determined among other scanned images included in the list.

14 Claims, 24 Drawing Sheets

(56) References Cited

U.S. PATENT DOCUMENTS

2019/0228220 A1* 7/2019 Matsumoto ........ G06K 9/00449
2019/0230232 A1* 7/2019 Soga .................... H04N 1/0044
2019/0266397 A1* 8/2019 Arakawa ............ H04N 1/00413

* cited by examiner

```
{
  "processId": "0039000-5555-3f33-5552-6999c30bcccc"
}
```

FIG. 9A

```
{
  "status": "processing"
}
```

FIG. 9B

```
{
  "status": "completed",
  "ocrResultUrl": "https://mfpservice/output-images/0039000-5555-3f33-5552-6999c30bcccc/ocrResult.json",
  "matchingResultUrl": "https://mfpservice/output-images/0039000-5555-3f33-5552-6999c30bcccc/matchingResult.json",
  "formKeys": [
    {
      "key": "filename",
      "keyType": "filename",
      "value": "",
      "type": "string",
      "displayName": "filename",
      "required": true,
      "multiSelect": true,
      "separator": "-",
      "autoInput": true
    }
  ]
}
```

Storage save — 1000

[Transmit] 1002  [Edit] 1003  [Delete] 1004

Already-scanned business form list — 1001

| Business form ID | Transmission destination | Status | Type |
| --- | --- | --- | --- |
| 001 | cloud storage A | unlearned | estimate form |
| 002 | cloud storage A | unlearned | estimate form |
| 003 | cloud storage A | learned | bill AAA |
| 004 | cloud storage A | unlearned | estimate form |
| 005 | cloud storage A | learned | bill BBB |

```
"formList":[
 {
  "formID": "001",
  "imageWidth": 2490,
  "imageHeight": 3515,
  "regions": [
   {
    "rect": [
     "x": 1019,
     "y": 303,
     "width": 489,
     "height": 95
    ],
    "text": "Estimate form"
   },
   {
    "rect": [
     "x": 261,
     "y": 446,
     "width": 243,
     "height": 43
    ],
    "text": "〒100-9999"
   },
   {
    "rect": [
     "x": 1584,
     "y": 446,
     "width": 262,
     "height": 38
    ],
    "text": "Estimate No."
   },
   {
    "rect": [
     "x": 1874,
     "y": 443,
     "width": 230,
     "height": 47
    ],
    "text": "R12-3456"
   }
 ※ ELEMENTS CORRESPONDING TO THE NUMBER OF CHARACTER AREAS ARE ADDED TO "regions"
  ],
 },
 {
  "formID": "002",
  ...
 },
※ ELEMENTS CORRESPONDING TO THE NUMBER OF BUSINESS FORMS DETERMINED TO BE THE SAME ARE ADDED
]
```

FIG.15

Storage save — 1000

- Transmit (1002)
- Edit (1003)
- Delete (1004)

Already-scanned business form list (1001)

| Business form ID | Transmission destination | Status | Type |
|---|---|---|---|
| 001 | cloud storage A | learned | estimate form CCC |
| 002 | cloud storage A | learned | estimate form CCC |
| 003 | cloud storage A | learned | bill AAA |
| 004 | cloud storage A | unlearned | estimate form |
| 005 | cloud storage A | learned | bill BBB |

FIG.17

Estimate form

〒100-9999  
A-A-A Ohta-ku, Tokyo  
Shimomaruko Inc. To

Estimate No. : R12-3500  
Date of issuance : 2017/09/29

| Item | Unit price | Quantity | Amount |
|---|---|---|---|
| GF-1555 | 10,000 | 2 | 20,000 |
|  |  |  |  |
|  |  |  |  |
|  |  |  |  |
|  |  | Total | 20,000 |

Kawasaki Inc.  
〒200-1111  
2-2-200 Yokohama-shi,  
Kanagawa prefecture

FIG.19

Storage save ~1000

[1002] Transmit  [1003] Edit  [1004] Delete

Already-scanned business form list ~1001

| Business form ID | Transmission destination | Status | Type |
|---|---|---|---|
| 001 | cloud storage A | learned | estimate form CCC |
| 002 | cloud storage A | learned | estimate form CCC |
| 003 | cloud storage A | learned | bill AAA |
| 004 | cloud storage A | unlearned | estimate form |
| 005 | cloud storage A | learned | estimate form CCC |

| Business form ID | Transmission destination | Status | Type | Check state |
|---|---|---|---|---|
| 001 | cloud storage A | unlearned | estimate form | checked |
| 002 | cloud storage A | unlearned | estimate form | checked |
| 003 | cloud storage A | learned | bill AAA | unchecked |
| 004 | cloud storage A | unlearned | estimate form | unchecked |
| 005 | cloud storage A | learned | bill BBB | unchecked |

FIG.23

IMAGE PROCESSING SYSTEM FOR COMPUTERIZING DOCUMENT, CONTROL METHOD THEREOF, AND STORAGE MEDIUM

BACKGROUND

Field

The present disclosure relates to a technique to set a property, such as a file name, to a scanned image of a document.

Description of the Related Art

Conventionally, as a document management method, a method is widely made use of, which converts a scanned image obtained by reading a document with a scanner into a file in a predetermined format and transmits the file to a storage server on a network and saves the file therein. In order to transmit a scanned image to a storage server on a network as a file, it is necessary to attach a file name. As a method of setting a file name, there is a method of extracting character information by performing OCR processing for a scanned image and selecting a character string that is used as a file name from the obtained character information. Further, it is also performed to save and accumulate in advance character area information on a character string used by a user in setting a file name for each business form type and automatically propose a character string to be used as a file name to a user for a scanned image in the business form whose feature is the same.

Here, in a case where a plurality of business forms is computerized, a use case is considered where first, computerization-target business forms and the like are scanned en bloc and then, the setting work of a file name for the scanned image of each business form is performed en bloc. In this regard, Japanese Patent Laid-Open No. 2019-159629 has disclosed a technique to present a list of image processing results for a plurality of documents to a user as well as saving the image processing results, and in a case where the image processing results of any document are corrected, to reflect the contents of correction in the saved image processing results. Then, as an example of the image processing results, OCR processing results are shown.

In a case of the technique of Japanese Patent Laid-Open No. 2019-159629 described above, the correction performed by a user is reflected only in the image processing results of the correction-target document among the saved image processing results of the plurality of documents. Because of this, for example, even in a case where this technique is applied to the file name setting at the time of computerizing a plurality of documents in the same document form en bloc, it is necessary for a user to set a file name to each of the plurality of scanned images generated en bloc. That is, in a case where the file name setting is performed for a certain scanned image among the plurality of scanned images generated en bloc, it is not possible to automatically propose a character string for the file name for the remaining scanned images in the same document form by making use of the results of the file name setting. In this case, it is necessary for a user to perform the same work repeatedly, and therefore, this is very troublesome.

The technique of the present disclosure has been made in view of the above-described problem and an object is to reduce time and effort of a user at the time of computerizing a plurality of documents en bloc.

SUMMARY

The image processing system according to the present disclosure is an image processing system including: a memory that stores a program; and a processor that executes the program to perform: displaying a first UI screen for setting a property relating to a scanned image by using a recognized character string obtained by performing character recognition processing for the scanned image and a second UI screen that displays a list of a plurality of scanned images; generating learning data by registering positional information relating to a recognized character string used for setting of the property in association with a document form of the scanned image; and determining, in a case where the learning data is generated in response to setting of the property being performed on the first UI screen for a first scanned image that is selected from the plurality of scanned images included in the list on the second UI screen, a scanned image having a document form similar to a document form of the first scanned image among other scanned images included in the list.

Further features of the present disclosure will become apparent from the following description of exemplary embodiments with reference to the attached drawings.

BRIEF DESCRIPTION OF THE DRAWINGS

FIG. 9A is a diagram showing an example of a request ID, FIG. 9B is a diagram showing an example of a response indicating that processing is being performed, and FIG. 9C is a diagram showing an example of a response indicating completion, respectively;

FIG. 10 is a diagram showing an example of a Storage save screen;

FIG. 15 is a diagram showing an example of a data structure of analysis results;

FIG. 17 is a diagram showing an example of the Storage save screen;

FIG. 19 is a diagram showing an example of a scanned image;

FIG. 21 is a diagram showing an example of the Storage save screen;

FIG. 22A and FIG. 22B are each a diagram showing an example of the File name setting screen; and FIG. 23 is a diagram showing an example of the Storage save screen.

DESCRIPTION OF THE EMBODIMENTS

Hereinafter, with reference to the attached drawings, the present disclosure is explained in detail in accordance with preferred embodiments. Configurations shown in the following embodiments are merely exemplary and the present disclosure is not limited to the configurations shown schematically.

First Embodiment

<System Configuration>

Figure 1:
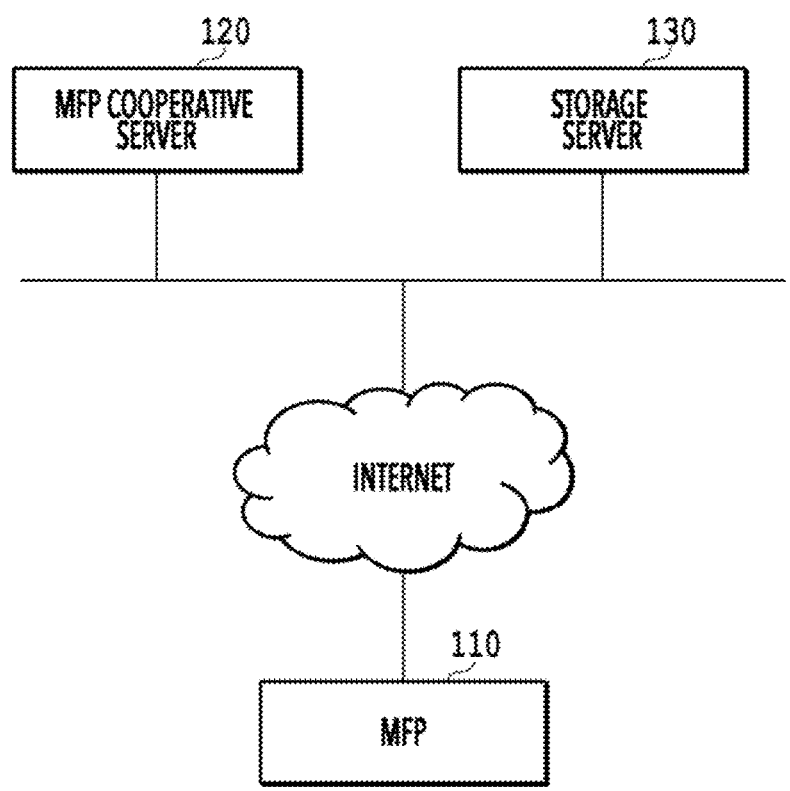
FIG. 1 is a diagram showing an entire configuration of an image processing system.

FIG. 1 is a diagram showing the entire configuration of an image processing system according to the present embodiment. The image processing system includes an MFP (Multifunction Peripheral) 110 and server apparatuses 120 and 130 providing cloud services on the internet. The MFP 110 is connected with the server apparatuses 120 and 130 so as to be capable of communication via the internet.

The MFP 110 is an example of an information processing apparatus having the scan function. The MFP 110 is a multifunction peripheral having a plurality of functions, such as the print function and the BOX save function, in addition to the scan function. Both the server apparatuses 120 and 130 are each an example of an information processing apparatus providing cloud services. The server apparatus 120 of the present embodiment provides cloud services to perform an image analysis for a scanned image received from the MFP 110, transfer a request from the MFP 110 to the server apparatus 130 providing other services, and so on. In the following, the cloud service provided by the server apparatus 120 is called "MFP cooperative service". The server apparatus 130 provides cloud services (hereinafter, called "storage services") to save a file sent via the internet, provide a saved file in response to a request from a web browser, such as a mobile terminal (not shown schematically), and so on. In the present embodiment, the server apparatus 120 that provides the MFP cooperative service is called "MFP cooperative server" and the server apparatus 130 that provides the storage service is called "storage server"

The configuration of the image processing system 100 shown in FIG. 1 is an example and the configuration is not limited to this. For example, the MFP 110 may also have the function of the MFP cooperative server 120. Further, the MFP cooperative server 120 may be connected with the MFP 110 via a LAN (Local Area Network) in place of the internet. Furthermore, it may also be possible to apply the present embodiment to an arrangement in which a scanned image of a document is transmitted by being attached to a mail by replacing the storage server 130 with a mail server that performs a mail distribution service.

<Hardware Configuration of MFP>

Figure 2:
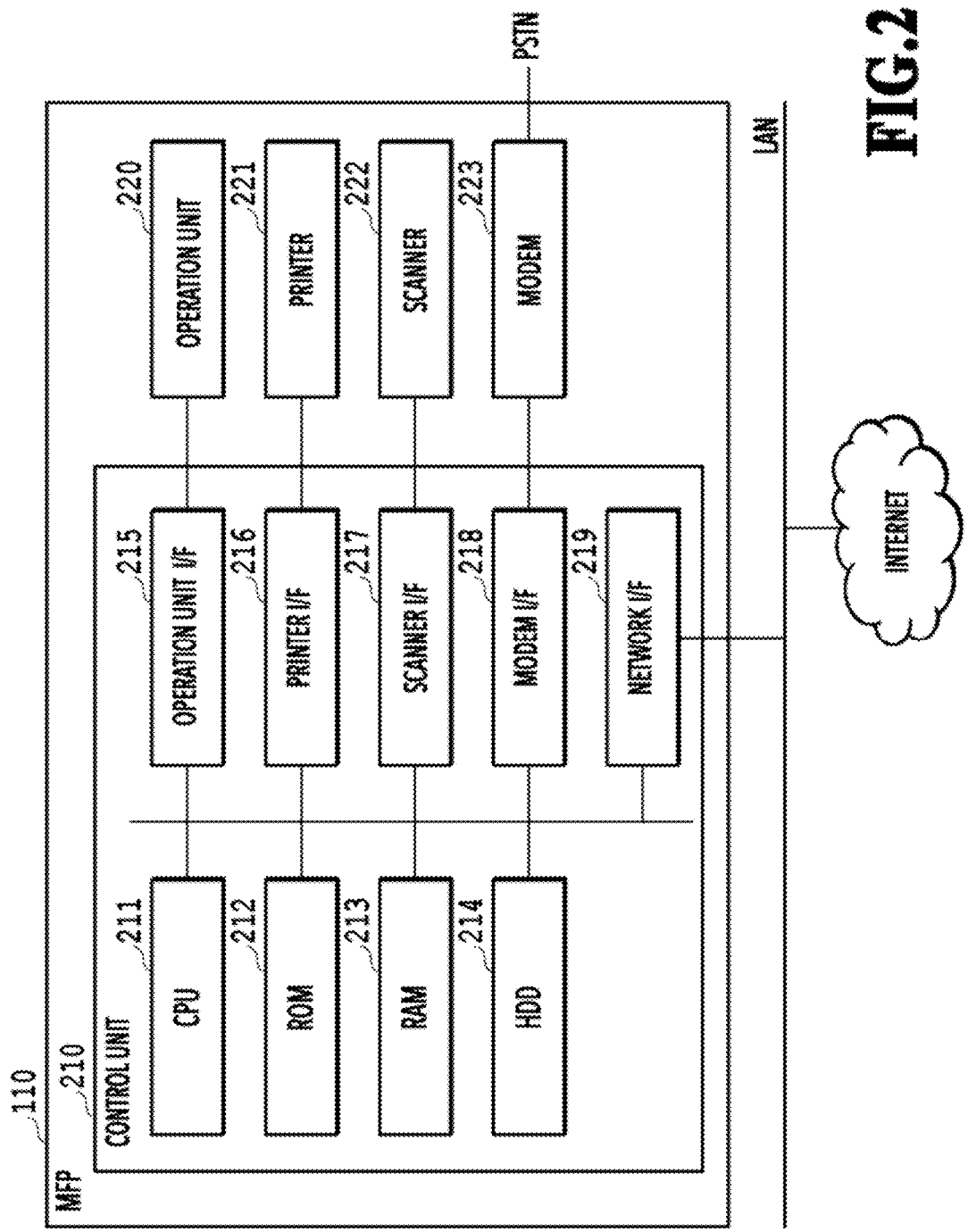
FIG. 2 is a block diagram showing a hardware configuration of an MFP.

FIG. 2 is a block diagram showing the hardware configuration of the MFP 110. The MFP 110 includes a control unit 210, an operation unit 220, a printer unit 221, a scanner unit 222, and a modem 223. The control unit 210 includes each of units 211 to 219 below and controls the operation of the entire MFP 110. The CUP 211 reads a variety of control programs (programs corresponding to various functions shown in a software configuration diagram, to be described later) stored in the ROM 212 and executes the programs. The RAM 213 is used as a temporary storage area, such as a main memory and a work area, of the CPU 211. In the present embodiment, the one CPU 211 performs each piece of processing shown in a flowchart, to be described later, by using the one memory (RAM 213 or HDD 214), but the present embodiment is not limited to this. For example, it may also be possible to perform each piece of processing by causing a plurality of CPUs and a plurality of RAMs or HDDs to cooperate with one another. The HDD 214 is a large-capacity storage unit configured to store image data and various programs. The operation unit I/F 215 is an interface that connects the operation unit 220 and the control unit 210. The operation unit 220 is provided with a touch panel and a keyboard and receives operations/inputs/instructions by a user. The touch operation to the touch panel includes the operation by a human finger and the operation by a touch pen. The printer I/F 216 is an interface that connects the printer unit 221 and the control unit 210. Image data to be printed is transferred from the control unit 210 to the printer unit 221 via the printer I/F 216 and printed on a printing medium, such as paper. The scanner I/F 217 is an interface that connects the scanner unit 222 and the control unit 210. The scanner unit 222 generates scanned image data by optically reading a document that is set on a document table or ADF (Auto Document Feeder), not shown schematically, and inputs the scanned image data to the control unit 210 via the scanner I/F 217. It is possible to print (copy and output) the scanned image data generated by the scanner unit 222 in the printer unit 221, save the data in the HDD 214, transmit the data to an external apparatus, such as the MFP cooperative server 120, as a file via a LAN, and so on. The modem I/F 218 is an interface that connects the modem 223 and the control unit 210. The modem 223 performs facsimile communication of image data with a facsimile device (not shown schematically) on the PSTN. The network I/F 219 is an interface that connects the control unit 210 (MFP 110) to a LAN. The MFP 110 transmits scanned image data to the MFP cooperative server 120, receives various kinds of data from the MFP cooperative server 120, and so on, by using the network I/F 219. The hardware configuration of the MFP 110 explained above is an example and the hardware configuration may comprise another configuration as needed or may not have a part of the configuration.

<Hardware Configuration of Server Apparatus>

Figure 3:
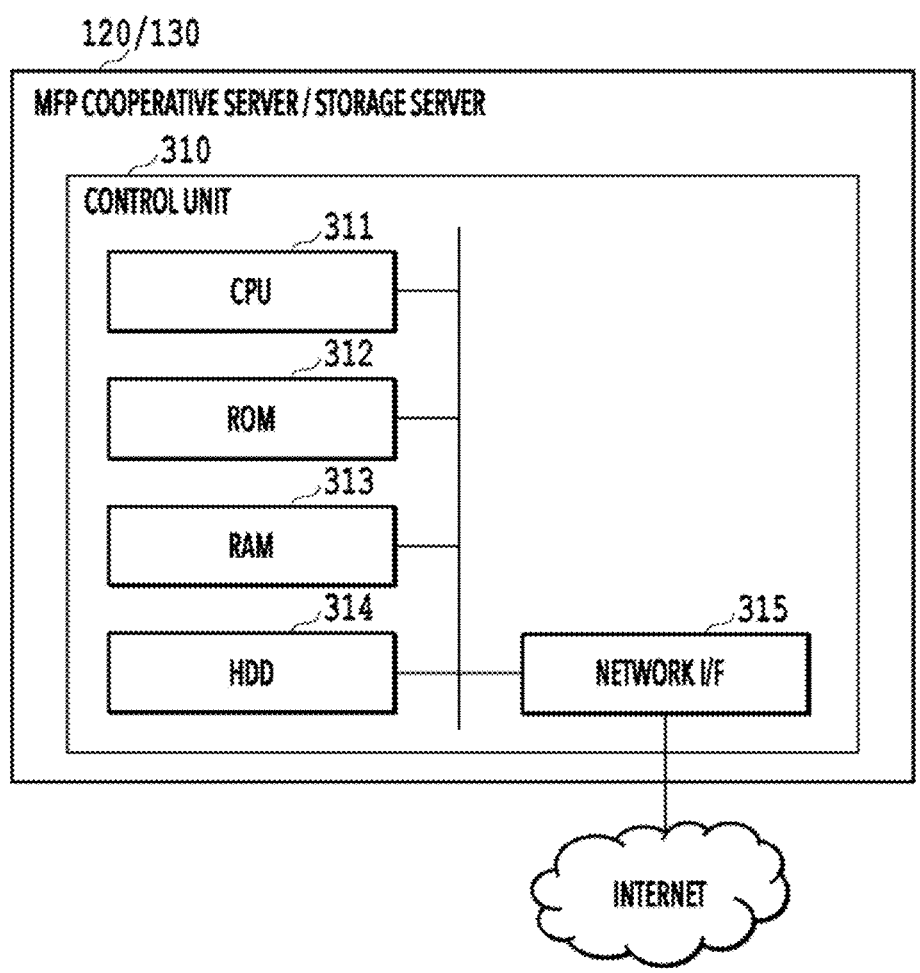
FIG. 3 is a block diagram showing a hardware configuration of an MFP cooperative server and a storage server.

FIG. 3 is a block diagram showing the hardware configuration of the MFP cooperative server 120/the storage server 130. The MFP cooperative server 120 and the storage server 130 have the common hardware configuration and include a CPU 311, a ROM 312, a RAM 313, an HDD 314, and a network I/F 315. The CPU 311 controls the entire operation by reading control programs stored in the ROM 312 and performing various kinds of processing. The RAM 313 is used as a temporary storage area, such as a main memory and a work area, of the CPU 311. The HDD 314 is a large-capacity storage unit configured to store image data and various programs. The network I/F 315 is an interface that connects a control unit 310 to the internet. The MFP cooperative server 120 and the storage server 130 receive requests for various kinds of processing from other apparatuses (MFP 110 and the like) via the network I/F 315 and return processing results in accordance with the requests.

<Software Configuration of Image Processing System>

Figure 4:
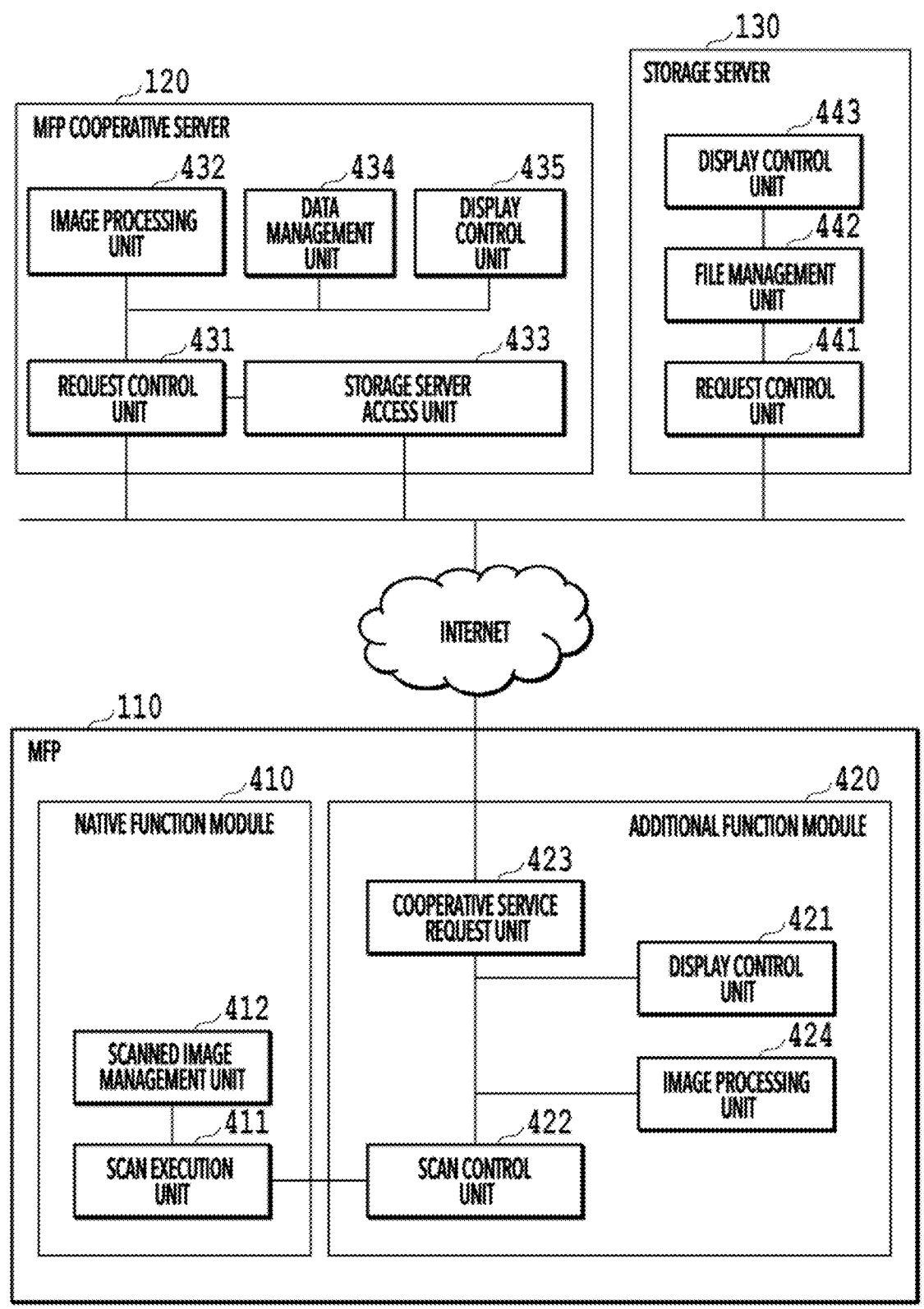
FIG. 4 is a block diagram showing a software configuration of the image processing system.

FIG. 4 is a block diagram showing the software configuration of the image processing system 100 according to the present embodiment. In the following, the software configuration corresponding to the role of each of the MFP 110, the MFP cooperative server 120, and the storage server 130, which configure the image processing system 100, is explained in order. In the following, explanation is given by narrowing the various functions possessed by each apparatus to the functions relating to processing to computerize (file) a document by performing a scan and save the computerized document in the storage server 130.

<<Software Configuration of MFP>>

The function modules of the MFP 110 are roughly divided into a native function module 410 and an additional function module 420. While the native function module 410 is an application provided as a standard one in the MFP 110, the additional function module 420 is an application that is installed additionally in the MFP 110. The additional function module 420 is an application based on Java (registered trademark) and it is possible to easily implement the addition of a function to the MFP 110. In the MFP 110, another additional application, not shown schematically, may be installed.

The native function module 410 has a scan execution unit 411 and a scanned image management unit 412. Further, the additional function module 420 has a display control unit 421, a scan control unit 422, a cooperative service request unit 423, and an image processing unit 424.

The display control unit 421 displays a user interface screen (UI screen) for receiving various user operations on a touch panel of the operation unit 220. The various user operations include, for example, inputting of login authentication information for accessing the MFP cooperative server 120, scan setting, instructions to start a scan, file name setting, instructions to save a file and the like.

The scan control unit 422 gives instructions to perform scan processing to the scan execution unit 411 along with scan setting information in accordance with the user operation (for example, pressing down of "Start scan" button) performed on the UI screen. The scan execution unit 411 causes the scanner unit 240 to perform the document reading operation via the scanner I/F 217 and generates scanned image data in accordance with the instructions to perform scan processing from the scan control unit 422. The generated scanned image data is saved in the HDD 214 by the scanned image management unit 412. At this time, the scan control unit 422 is notified of information on a scanned image identifier uniquely indicating the saved scanned image data. The scanned image identifier is a number, symbol, alphabet and the like for uniquely identifying the image scanned in the MFP 110. The scan control unit 422 acquires, for example, the scanned image data that is the target to be filed from the scanned image management unit 412 by using the above-described scanned image identifier. Then, the scan control unit 422 instructs the cooperative service request unit 423 to make a request for processing necessary to file the scanned image data to the MFP cooperative server 120.

The cooperative service request unit 423 makes requests for various kinds of processing to the MFP cooperative server 120, receives responses thereto, and so on. The various kinds of processing include, for example, login authentication, scanned image analysis, transmission of scanned image data and the like. For transmission and reception with the MFP cooperative server 120, a communication protocol, such as REST and SOAP, is used.

The image processing unit 424 generates an image used on the UI screen that is displayed by the display control unit 421 by performing predetermined image processing for scanned image data. Details of the predetermined image processing will be described later.

It may also be possible for an apparatus (client PC or the like, not shown schematically) different from the MFP 110 to comprise the above-described additional function module 420. That is, the system configuration may be one in which a client PC makes an analysis request for the scanned image obtained by the MFP 110 and performs the setting of a file name based on analysis results.

<<Software Configuration of Server Apparatus>>

First, the software configuration of the MFP cooperative server 120 is explained. The MFP cooperative server 120 has a request control unit 431, an image processing unit 432, a storage server access unit 433, a data management unit 434, and a display control unit 435. The request control unit 431 stands by in the state of being capable of receiving a request from an external apparatus and instructs the image processing unit 432, the storage server access unit 433, and the data management unit 434 to perform predetermined processing in accordance with received request contents. The image processing unit 432 performs image modification processing, such as rotation and inclination correction, in addition to analysis processing, such as character area detection processing, character recognition processing (OCR processing), and similar document determination processing, for the scanned image data that is sent from the MFP 110. In the following, a character area detected from a scanned image is called "text block". Further, explanation is given by taking a business form, such as an estimate form or a bill, as an example of a target document and there is a case where the scanned image thereof is called "business form image". The storage server access unit 433 makes a request for processing to the storage server 130. The cloud service has made public a variety of interfaces for saving a file in the storage server, acquiring a saved file, and so on by using a protocol, such as REST and SOAP. The storage server access unit 433 makes a request to the storage server 130 by using the interface made public. The data management unit 434 stores and manages user information, image analysis results, various kinds of setting data and the like, which are managed in the MFP cooperative server 120. The display control unit 435 receives a request from a web browser running on a PC or a mobile terminal (neither of them is shown schematically) connected via the internet and returns screen configuration information (HTML, CSS and the like) necessary for the screen display. It is possible for a user to check the registered user information, change the scan setting, and so on via the screen displayed on the web browser.

Next, the software configuration of the storage server 130 is explained. The storage server 130 has a request control unit 441, a file arrangement unit 442, and a display control unit 443. The request control unit 441 stands by in the state of being capable of receiving a request from an external apparatus and in the present embodiment, instructs the file arrangement unit 442 to save a received file and read a saved file in response to a request from the MFP cooperative server 120. Then, the request control unit 441 returns a response in accordance with the request to the MFP cooperative server 120. The display control unit 443 receives a request from a web browser running on a PC or a mobile terminal (neither of them is shown schematically) connected via the internet and returns screen configuration information (HTML, CSS and the like) necessary for the screen display. It is possible for a user to check and acquire a saved file via the screen that is displayed on the web browser.

<Flow of Processing of Entire Image Processing System>

Figure 5:
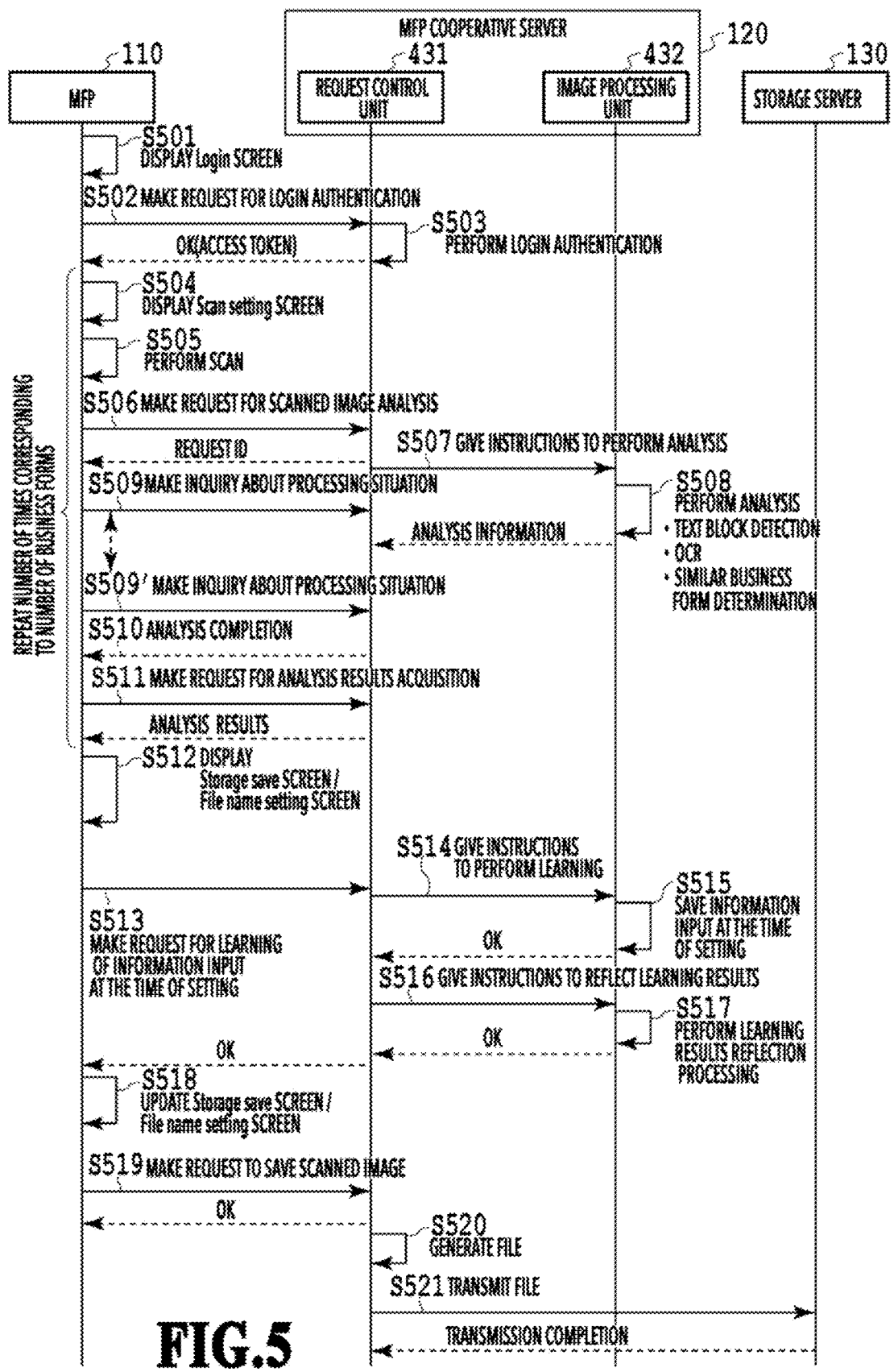
FIG. 5 is a sequence diagram showing a flow of processing of the entire image processing system.
Figure 6:
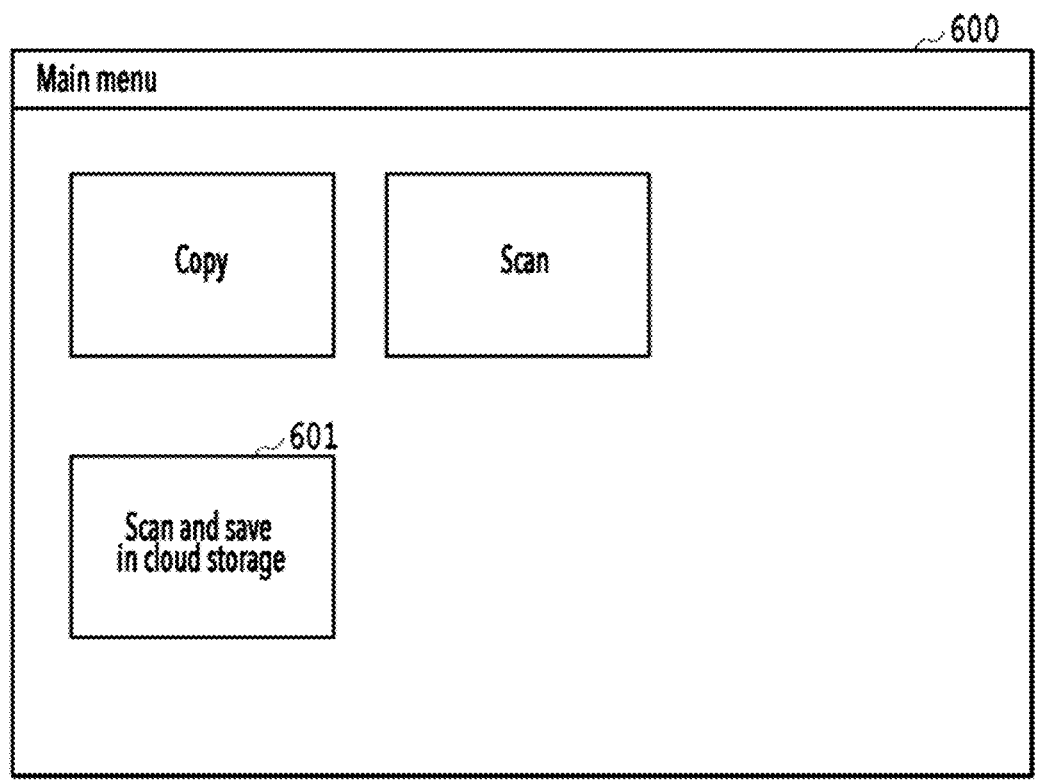
FIG. 6 is a diagram showing an example of a Main menu UI screen.

FIG. 5 is a sequence diagram showing a flow of processing among the apparatuses in a case where a document (business form) is canned in the MFP 110 and the obtained business form image is filed and stored in the storage server. FIG. 6 is a diagram showing an example of a UI screen of a Main menu (hereinafter, described as "Main screen") that is displayed at the time of the activation of the MFP 110. In a case where a document is filed by performing a scan and a dedicated application necessary to make use of the cloud storage service is installed, a "Scan and save in cloud storage" button 601 is displayed on a Main screen 600. Then, in a case where a user presses down the "Scan and save in cloud storage" button 601 among the menu buttons displayed within the Main screen 600, the series of processing shown in the sequence diagram in FIG. 5 starts. The sequence diagram in FIG. 5 explains a case where a file name that is attached at the time of a scanned image being filed is set, but it is possible to apply the sequence diagram in FIG. 5 to general properties, such as a folder path and metadata, in addition to a file name.

In the following, along the sequence diagram in FIG. 5, the operations among the apparatuses are explained in a time series. In the following explanation, symbol "S" represents a step.

Figure 7:
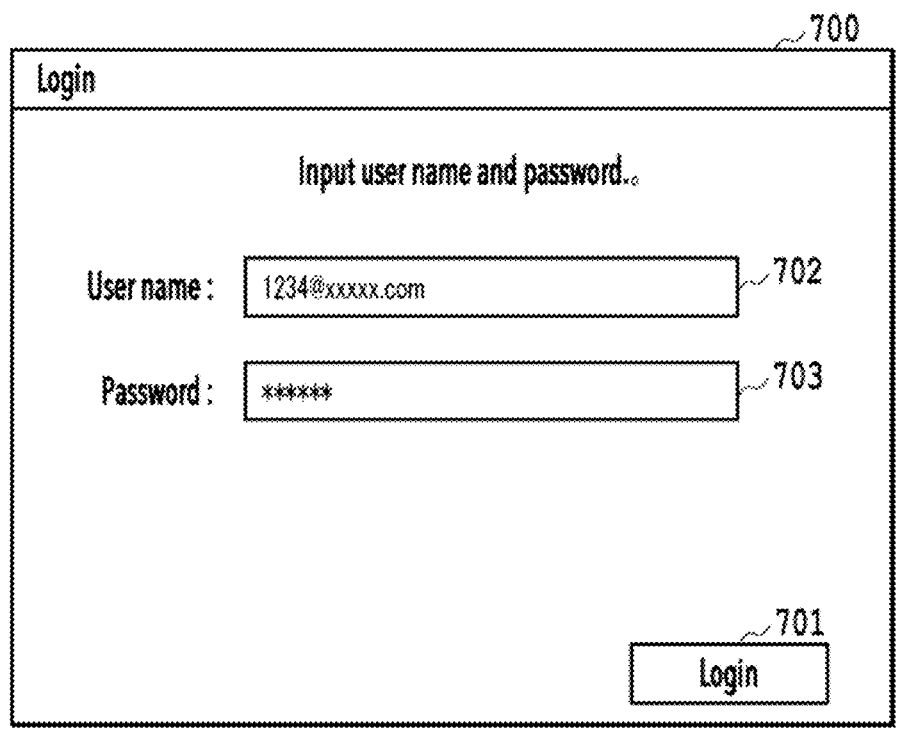
FIG. 7 is a diagram showing an example of a Login screen.

The MFP 110 displays a UI screen (hereinafter, described as "Login screen") on which to input information on login authentication for accessing the MFP cooperative server 120 on the operation unit 220 (S501). FIG. 7 shows an example of a Login screen. In a case where a user inputs a user ID and a password, which are registered in advance, in input fields 702 and 703, respectively, on a Login screen 700 and presses down a "Login" button 701, a request for login authentication is transmitted to the MFP cooperative server 120 (S502).

The MFP cooperative server 120 having received the request for login authentication performs authentication processing by using the user ID and the password, which are included in the request (S503). In a case where it is checked that the user is a genuine user by the results of the authentication processing, the MFP cooperative server 120 returns an access token to the MFP 110. After this, by sending this access token together at the time of the MFP 110 making various requests to the MFP cooperative server 120, a login user is specified. In the present embodiment, it is assumed that at the same time the login to the MFP cooperative server 120 is completed, the login to the storage server 130 is also completed. Because of this, a user performs in advance association between the user ID for making user of the MFP cooperative service and the user ID for making use of the storage service via a web browser or the like of a PC (not shown schematically) on the internet. Due to this, in a case where the login authentication to the MFP cooperative server 120 succeeds, the login authentication to the storage server 130 is also completed at the same time and it is possible to omit the operation to log in to the storage server 130. Then, it is made possible for the MFP cooperative server 120 to deal with a request relating to the storage service from a user who has logged in to the MFP cooperative server 120. Generally, it may be possible to perform the login authentication method by using a publicly known method (Basic authentication, Digest authentication, authentication using OAuth, and the like).

Figure 8:
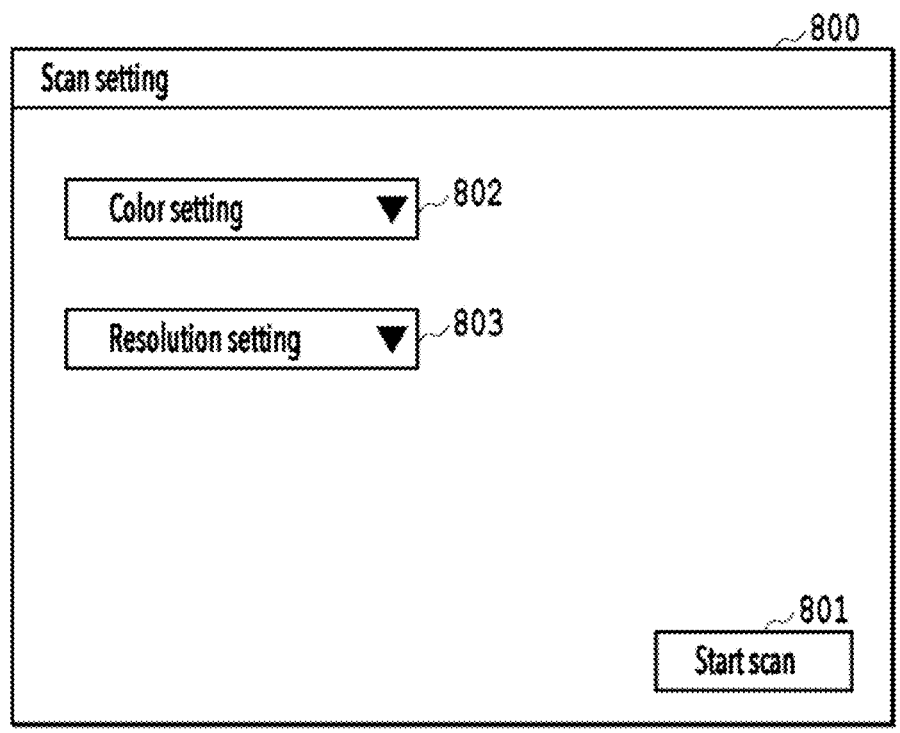
FIG. 8 is a diagram showing an example of a Scan setting screen.

In a case where the login is completed, in the MFP 110, a UI screen for scan setting (hereinafter, described as "Scan setting screen") is displayed on the operation unit 220 (S507). FIG. 8 shows an example of a Scan setting screen. On a Scan setting screen 800, a "Start scan" button 801, a Color setting field 802, and a Resolution setting field 803 exist. The "Start scan" button 801 is a button to give instructions to start scan processing for a document (in the present embodiment, a business form, such as an estimate form and a bill, is supposed) set on a document table. In the Color setting field 802, the color mode at the time of scan is set. For example, it is possible to specify one of alternatives, such as full color and monochrome. In the Resolution setting field 803, the resolution at the time of scan is set. For example, it is possible to specify one of alternatives, such as 600 dpi and 1,200 dpi. The color mode and the resolution are examples of the setting items and it is not necessary for all of these setting items to exist, or another setting item other than these may exist. Further, it may also be possible to limit the alternatives relating to the color mode and the resolution only to the setting values required in the storage service. A login user performs detailed condition setting as to the scan processing via the Scan setting screen 800 such as this. In a case where a login user having completed the scan setting sets a scan-target document on the document table of the MFP 110 and presses down the "Start scan" button 801, a scan is performed (S505). Due to this, scanned image data obtained by computerizing a paper document is generated. After the scan is completed, the MFP 110 transmits the scanned image data obtained by the scan to the MFP cooperative server 120 along with an analysis request therefor (S506).

In the MFP cooperative server 120 having received the analysis request for a business form image, the request control unit 431 instructs the image processing unit 432 to perform analysis processing (S507). At that time, the request control unit 431 returns a request ID capable of uniquely specifying the received analysis request to the MFP 110. FIG. 9A shows an example of the request ID. On the other hand, the image processing unit 432 having received the instructions to perform analysis processing performs analysis processing for the business form image relating to the analysis request (S508). In this analysis processing, first, processing to detect a text block existing within the business form image that is the target (hereinafter, described as "target business form image") is performed. For the detection of a text block, for example, it may be possible to apply an already-known method, such as a method of extracting a square area estimated to be a character from an image for which binarization has been performed with a certain threshold value. Next, for each text block found by the text block detection processing, character recognition processing (OCR: Optical Character Recognition) is performed. Then, processing (business form determination processing) is performed to determine whether the target business form image is similar to a business form image computerized previously by collating the target business form image with learning data. For the determination of a similar business form, arrangement information is used that indicates at which position within the business form image each text block existing within the target business form image is located. Specifically, by comparing the arrangement information on the target business form image of this time and the arrangement information on the past business form image accumulated in the learning data, whether the text block arrangement is the same/similar is determined. This is based on that it is possible to estimate that business forms are the same kind created by using the same document form in a case where the text block arrangement is in the same or similar relationship. The arrangement information on the past business form image used for the determination of a similar business form is accumulated as learning data by "learning processing", to be described later. The results obtained by the analysis processing such as this are delivered to the request control unit 431. In the present embodiment, the determination of whether or not a business form is similar is performed based on only the matching rate of the text block arrangement, but for example, it may also be possible to perform the determination of whether or not a business form is similar by specifying the type (estimate form, bill and the like) of the business form from the OCR results and taking into consideration information on the obtained type.

While the above-described analysis processing is being performed, the MFP 110 periodically (for example, about every several hundred milliseconds to several milliseconds) makes an inquiry about the processing situation to the MFP cooperative server 120 by using the above-described request ID (S509 to S09'). This inquiry is made repeatedly until a completion response (S510) of the analysis processing from the MFP cooperative server 120 is acquired. Upon receipt of the inquiry about the processing situation, the MFP cooperative server 120 checks the progress situation of the analysis processing corresponding to the request ID and in a case where the analysis processing is not completed, the MFP cooperative server 120 returns a response (see FIG. 9B) indicating that the processing is being performed. Further, in a case where the analysis processing is completed, the MFP cooperative server 120 returns a response (see FIG. 9C) indicating completion. In "status" of this response, a character string indicating the current processing situation, specifically, in a case where the processing is being performed in the MFP cooperative server 120, "processing" is input and in a case where the processing is completed, "completed" is input. There is a case where a character string indicating another status is input, such as "failed" on a condition that the processing has failed. As shown in FIG. 9C, the response at the time of processing completion includes information about the business form image analysis results and the like, in addition to the status information. The analysis processing in the MFP cooperative server 120 at S507 to S511 will be described later separately with reference to a flowchart.

After receiving the processing completion response, the MFP 110 makes a request for the analysis processing results to the MFP cooperative server 120 by using URL indicating the storage destination of the image analysis results included in the response (S511). As the URL in this case, there are "ocrResultUrl" and "matchingResultUrl". Upon receipt of the request, the request control unit 431 of the MFP cooperative server 120 returns analysis processing results information.

Then, the series of processing (S504 to S511) from the display of the Scan setting screen until the acquisition of the image analysis results is repeated the number of times corresponding to the number of target business forms to be filed. Alternatively, it may also be possible to scan a plurality of business forms en bloc at S505 and perform the analysis instructions (S507) and the analysis processing (S508) based on the analysis request therefor (S506) separately for each business form.

Figure 11:
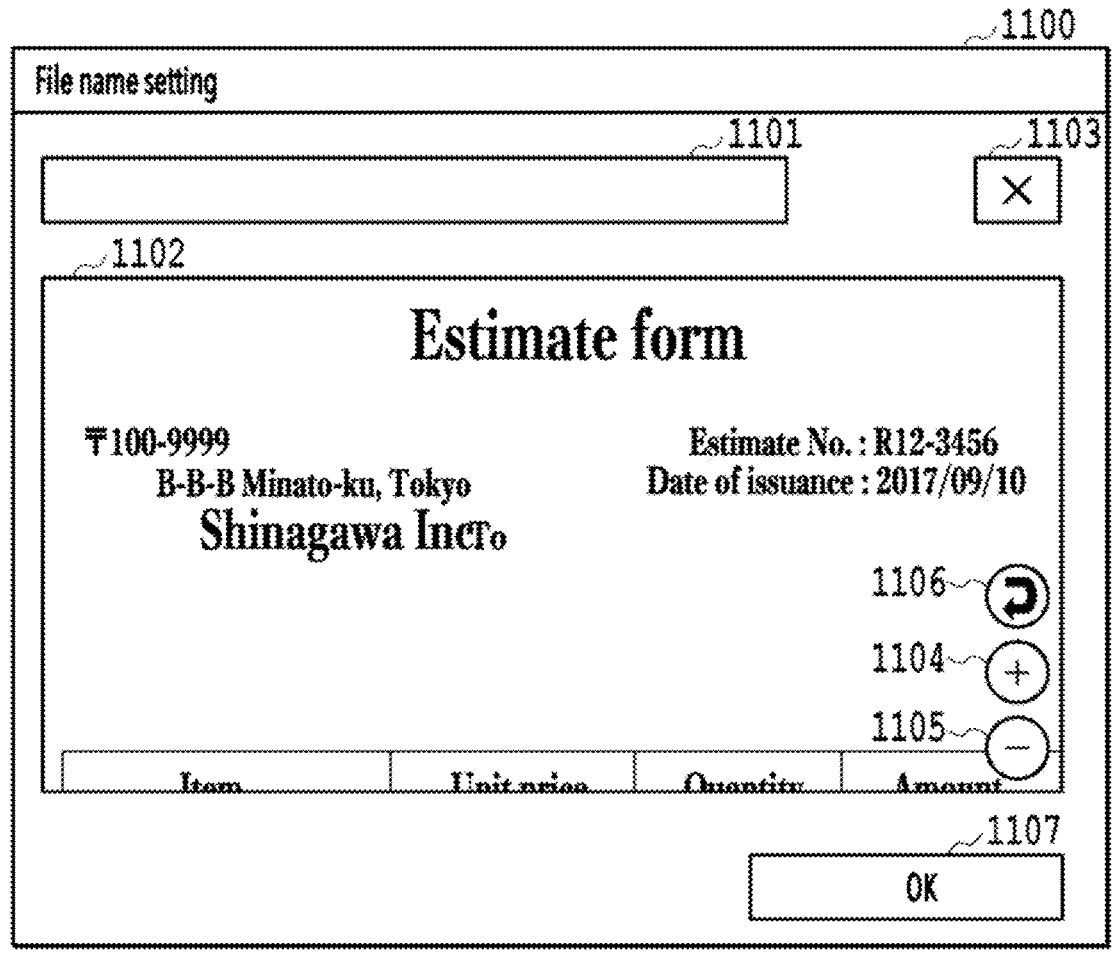
FIG. 11 is a diagram showing an example of a File name setting screen.

Then, the MFP 110 displays a UI screen (hereinafter, described as "Storage save screen") for setting a file name to each business form image and saving each business form image in the storage server 130 by using the analysis processing results information on the plurality of business forms (S512). The file name is one kind of information that is set as a property (attribute) relating to scanned image data. FIG. 10 shows an example of a Storage save screen. On a Storage save screen 1000 in FIG. 10, a business form list area 1001, a "Transmit" button 1002, an "Edit" button 1003, and a "Delete" button 1004 exist. In the business form list area 1001, a list of already-scanned business forms having been the analysis processing targets is displayed in the list form. Already-scanned business form list consists of four items: "Business form ID", "Transmission destination", "Status", and "Type". In Business form ID, an identifier uniquely identifying each business form image is input. In "Transmission destination", the name of the storage server 130 that is the transmission destination of filed data is input. In "Status", either "unlearned" or "learned" is input as information indicating the results at the time of performing business form determination processing, to be described later. Here, "unlearned" indicates that it is determined that a business form (similar business form whose feature matches) created in the same business form does not exist in the learning data and "learned" indicates that it is determined that a similar business form exists. In "Type", information indicating the type of business form, for example, a name indicating the type of business form name, such as "estimate form" and "bill", is input. For the business form whose "Status" is "learned", more detailed information capable of specifying with which type of business form in the type of business form the business form matches is input. For example, in a case where the type of business form is "bill", more detailed information, such as "bill AAA" and "bill BBB", capable of specifying the past business form image determined to be the most similar in the business form determination processing is input. The "Transmit" button 1002 is a button for transmitting file data of a target business form image to the storage server 130. By selecting an arbitrary business form from Already-scanned business form list and pressing down the "Transmit" button 1002, file transmission is performed for the storage server 130 specified by "Transmission destination" thereof. In a case where the file transmission is completed normally, the information corresponding to one row relating to the business form is deleted from Already-scanned business form list. The "Edit" button 1003 is a button for switching the UI screen to a File name setting screen 100, to be described later. By selecting an arbitrary business form from Already-scanned business form list and pressing down the "Edit" button 1003, the UI screen makes a transition to a UI screen for setting a file name for the business form relating to the selection. The "Delete" button 1004 is a button for deleting an arbitrary business form. By selecting an arbitrary business form from Already-scanned business form list and pressing down the "Delete" button 1004, the selected business form is deleted from Already-scanned business form list. In a case where an operation event is detected, in which one arbitrary business form is selected from Already-scanned business form list and following this, the "Edit" button 1003 is pressed down, the Storage save screen 1000 makes a transition to the File name setting screen 1100 as shown in FIG. 11, on which a scanned image of the business form relating to the user selection is preview-displayed. Details of file name setting using the File name setting screen 1100 will be described later. In a case where a user sets a file name on the File name setting screen 1100 in FIG. 11 and presses down an "OK" button 1107, the File name setting screen 1100 returns to the Storage save screen 1000 shown in FIG. 10 again. Then, a user presses down the "Transmit" button 1002 within the Storage save screen 1000 in FIG. 10.

In response to the pressing down of the "Transmit" button 1002, the MFP 110 transmits a learning request including information (information that is input at the time of setting) relating to the input operation performed by a user in setting the file name to the scanned image of the business form relating to the user selection to the MFP cooperative server 120 (S513). In the MFP cooperative server 120 having received the learning request, the request control unit 431 instructs the image processing unit 432 to perform learning processing (S514). Upon receipt of the instructions, the image processing unit 432 saves arrangement information on each text block existing in the target business form image and input information (information on text block used for a file name) at the time of file name setting included in the learning request received at S513 as learning data (S515). The request control unit 431 having received a save completion notification further instructs the image processing unit 432 to perform processing (hereinafter, called "learning results reflection processing") to reflect the learning results in Already-scanned business form list (S516). Upon receipt of the instructions, the image processing unit 432 performs the learning results reflection processing using the learning data after the learning at S515 (S517). Details of the learning results reflection processing will be described later. In a case where the learning processing and the learning results reflection processing that follows are completed, the request control unit 431 returns a processing completion response to the MFP 110.

Then, the MFP 110 having received the completion response of the learning processing and the learning results reflection processing from the MFP cooperative server 120 updates the File name setting screen 1100 described previously (S518). After that, the MFP 110 transmits a request to save the business form image to the MFP cooperative server 120 (S519) along with the data of the business form image relating to the selection and the information on the file name and the like to be set at the time of file transmission. In the MFP cooperative server 120 having received the save request, the request control unit 431 returns a response indicating that the save request has been received normally to the MFP 110 as well as starting file generation processing. The MFP 110 having received the response terminates the processing and the display state of the Scan setting screen (S504) is returned. On the other hand, the MFP cooperative server 120 acquires information on a file format from the scan setting registered in advance and files the business form image in accordance with the file format (S520). At this time, to the generated file, the file name specified by the save request is attached. The business form image file thus generated is transmitted to the storage server 130 and saved therein (S521).

The above is a rough flow of the processing of the entire image processing system. In the sequence in FIG. 5, the contents are such that the MFP 110 performs operations with the MFP cooperative server 120, but a configuration may be accepted in which analysis results acquisition, UI screen display, learning instructions and the like are performed by a client PC or the like, not shown schematically.

<File Name Setting>

A user sets a file name to a business form image that is saved in the storage server 130 by using the File name setting screen 1100 illustrated in FIG. 11. In the following, detailed explanation is given.

A file name input field 1101 is an area in which a file name set by a user is displayed. Further, in a case where a blank portion in the file name input field 1101 is touched, a soft keyboard is displayed, and it is possible to input an arbitrary character. In the state where a character string as a file name is input and displayed, in a case where the character string is touched, a soft keyboard for correcting the character string of the touched portion is displayed and it is possible to correct the character that is input and being displayed. A preview area 1102 is an area in which a business form image is preview-displayed. Further, by touching a text block within the preview-displayed image, it is possible to add the character string within the text block corresponding to the touched position as a character string configuring a file name. It may also be possible to highlight the text block selected by a touch or the like by attaching a line, a frame, a color or the like to the text block so as to indicate that the text block is selected. Further, in a case where a user selects a plurality of text blocks, it may also be possible to make the color of each text block different from one another. Furthermore, it may also be possible to change the preview display position and the enlargement ratio so that the selected text block is located at the center. In a case where a plurality of text blocks exists, it may also be possible to calculate the preview display position so that text blocks corresponding to the number of blocks set in advance are displayed. For example, a preview is displayed by changing the display position and the enlargement ratio so that the middle portion of the uppermost area and the lowermost area of the area used for a file name is located at the center in the vertical direction of the preview area. In a case where a text block selected once is touched again, the selection is cancelled and the corresponding character string is deleted and the state where the line, color or the like attached to the text block is not displayed is returned. In the example of the File name setting screen 1100 shown in FIG. 11, in the state where none of the text blocks is selected, each text block is not displayed on the preview image. However, in order to indicate which portion can be selected to a user, it may also be possible to display each text block by using a color or a frame line so that each text block can be visually recognized. Further, it may also be possible to enable switching between display and non-display with a button or the like for the display that enables each text block to be recognized visually. By performing the swipe operation for the preview image, it is possible to move the position of the preview image that is displayed in the preview area 1102.

A delete button 1103 is a button for deleting the character corresponding to the text block located at the end among the characters being displayed in the file name input field 1101. An enlargement button 1104 is a button for increasing the display magnification of the preview image being displayed in the preview area 1102. A reduction button 1105 is a button for reducing the display magnification of the preview image being displayed in the preview area 1101. The display position is adjusted so that the coordinates of the center of the preview area 1102 are the same before enlargement and reduction at the time of enlargement and reduction. An initial display button 1106 is a button for returning the display magnification and the display position to those in the initial state in a case where the display position of the preview image has been moved by the swipe operation or the display magnification has been changed by the enlargement button 1104 or the reduction button 1105. The OK button 1107 is a button for returning the UI screen display to the Storage save screen 1000 shown in FIG. 10 described previously in order to transmit the business form image data to the MFP cooperative server 120 along with the set file name in the stage in which the file name setting is completed.

Figure 12:
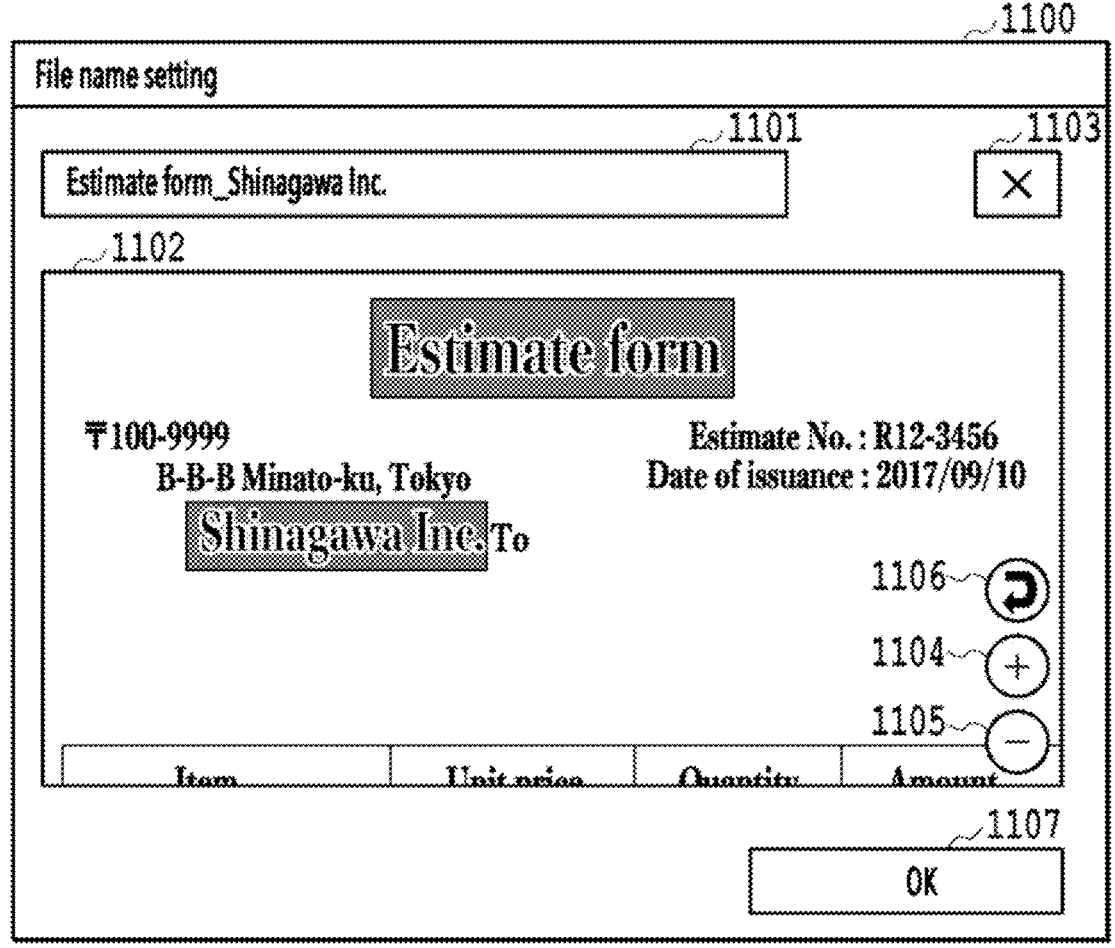
FIG. 12 is a diagram showing an example of the File name setting screen.

FIG. 12 is a diagram showing the File name setting screen 1100 in a case where the text block whose characters have been recognized as "Estimate form" is selected first and following this, the text block whose characters have been recognized as "Shinagawa Inc." is selected. In the file name input field 1101, the two character strings corresponding to the order of the touched text blocks are input and between the two character strings, an underscore as a separator is input. The underscore may be input manually by a user or may be input automatically.

<Details of Scanned Image Analysis Processing>

Figure 13:
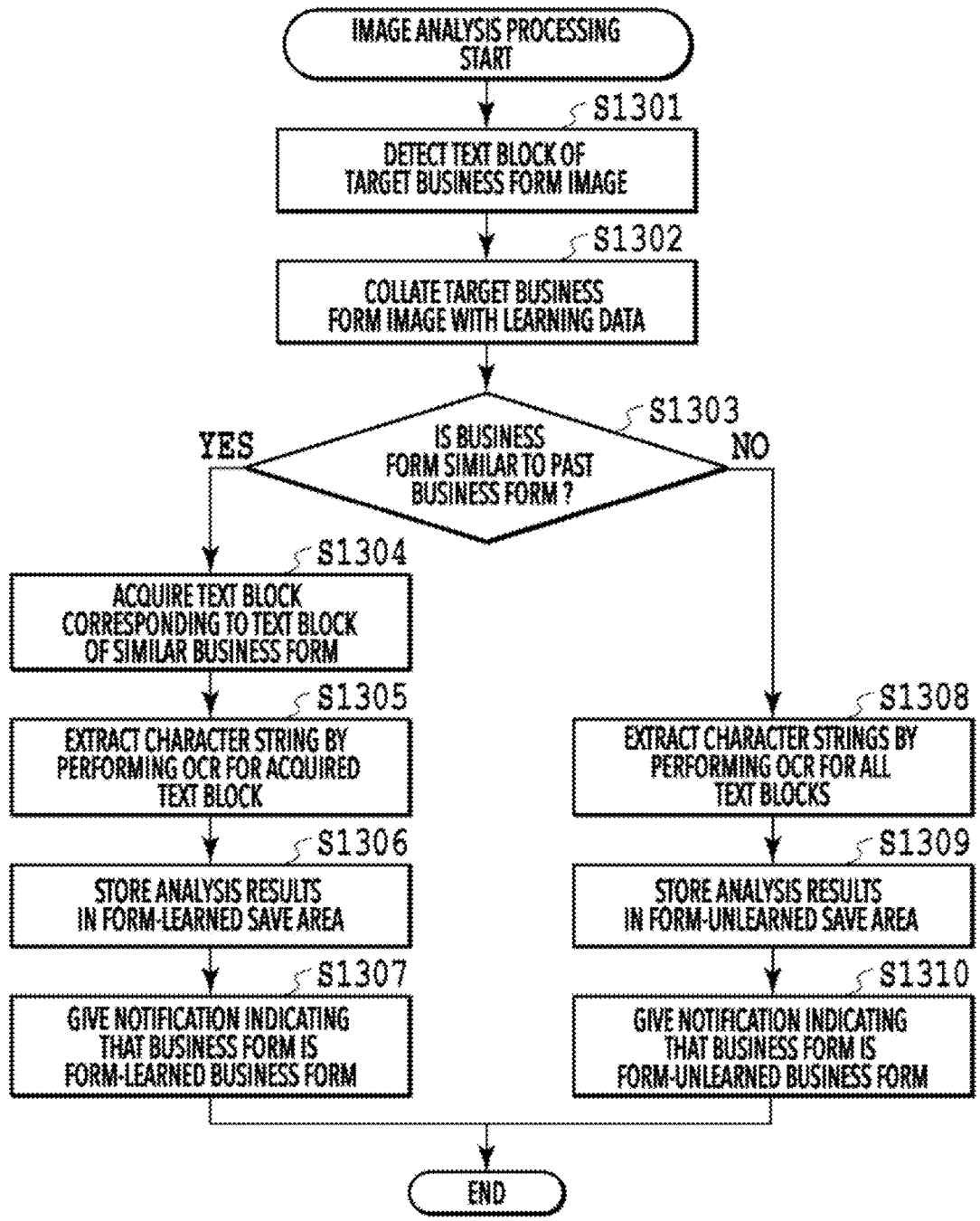
FIG. 13 is a flowchart showing details of scanned image analysis processing.

Following the above, details of the analysis processing (S508) performed by the image processing unit 432 are explained in detail along the flowchart in FIG. 13.

First, at S1301, processing to detect a text block existing in the target business form image relating to the analysis request is performed. Due to this, the arrangement and the size of the text block for each character string included within the target business form image are specified. Next, at S1302, the business form determination processing described previously using learning data is performed for the target business form image. In a case where a similar business form is found as a result of the determination (Yes at S1303), the processing advances to S1304 and in a case where no similar business form is found (No at S1303), the processing advances to S1308.

At S1304, among all the text blocks detected from the target business form image, the text block corresponding to the text block registered for the found similar business form is acquired. Here, the text block registered for the similar business form means the text block of the character string used as the file name of the scanned image of the similar business form.

At S1305 that follows, OCR processing is performed for the text block acquired at S1304 and the character string within the text block is recognized and extracted. Due to this, it is possible to propose the file name expected to be set by a user for the target business form image to a user based on the file name setting rule of the similar business form.

Figure 14:
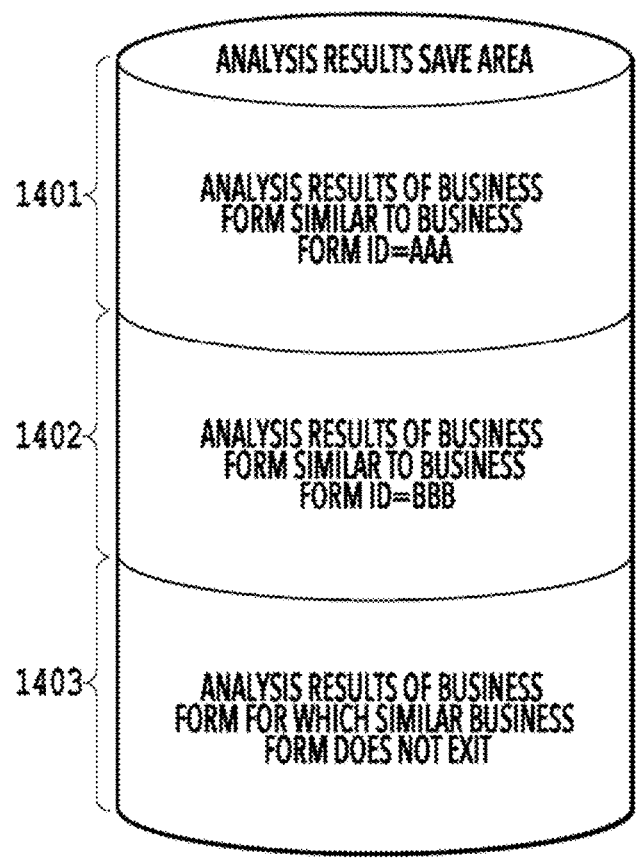
FIG. 14 is a diagram schematically showing a structure of an analysis results save area.

Next, at S1306, the data management unit 434 is instructed to save the analysis results of the target business form image. Upon receipt of the instructions, the data management unit 434 saves the analysis results of the target business form image in the HDD 314. FIG. 14 is a diagram schematically showing a structure of an analysis results save area within the HDD 314. At S1306 in a case where a similar business form is found, the analysis results are stored in the save area of the similar business form whose similarity is the highest (in this example, area 1401 or area 1402) among form-learned save areas allocated for each Business form ID. FIG. 15 is a diagram showing an example of a data structure of analysis results stored in the save area shown in FIG. 14. In FIG. 15, below "formList", the analysis results relating to a plurality of business form images are stored in order for each business form (for each scanned image). Each business form has information on "formID", "imageWidth", "imageHeight", and "regions". Here, "formID" is an identifier that uniquely identifies each business form, "imageWidth" indicates the number of pixels in the X-direction (horizontal direction) of the analysis-target business form image, "imageHeight" indicates the number of pixels in the Y-direction (vertical direction) of the analysis-target business form image, and "regions" includes coordinate information and character string information on the text block detected from the analysis-target business form image. Within "regions", the following information is included further. That is, "rect" indicates coordinate information on each text block, "x" indicates the X-coordinate of the top left, "y" indicates the Y-coordinate of the top left, "width" indicates the number of pixels in the X-direction, and "height" indicates the number of pixels in the Y-direction. Further, "text" indicates the OCR results (recognized character string) of the text block indicated by "rect". The information on "rect" and "text" is included corresponding to the number of all text blocks within the business form image obtained by the analysis. Then, at S1307, the request control unit 431 is notified of information indicating that the business form relating to the target business form image is a form-learned business form and this flow is terminated.

On the other hand, at S1308 in a case where no similar business form is found, the OCR processing is performed for all the text blocks detected from the target business form image and character strings within all the text blocks are recognized and extracted. The reason the OCR processing is performed for all the text blocks is that there is no information on the text block estimated to be used for the setting of a file name. At S1309 that follows, the data management unit 434 is instructed to save the analysis results for the target business form image. Upon receipt of the instructions, the data management unit 434 saves the analysis results for the target business form image in the HDD 314. Here, because of the case where it is determined that no similar business form is found, the analysis results are stored in a form-unlearned save area (in this example, area 1403) of the save areas shown in FIG. 14. After that, at S1310 the request control unit 431 is notified of information indicating that the business form relating to the target business form image is a form-unlearned business form and this flow is terminated.

The above is the contents of the analysis processing for the target business form image in the image processing unit 432.

<Learning Results Reflection Processing>

Next, the processing (S517) to reflect the learning results in Already-scanned business form list after the learning processing is explained in detail by taking two cases as an example. Case 1 is a case where a plurality of business form images exists in Already-scanned business form list, for which it is determined that no similar business form exists (that is, the business form is a business form in a new form) in the business form determination processing (S508) at the time of analysis processing. Case 2 is a case where a plurality of business form images exists. for which it is determined that a similar business form exists in the business form determination processing (S508) at the time of analysis processing and for one of them, a user has corrected the file name on the File name setting screen 1100. In the following, the learning results reflection processing in each case is explained.

《Case 1》

Figure 16:
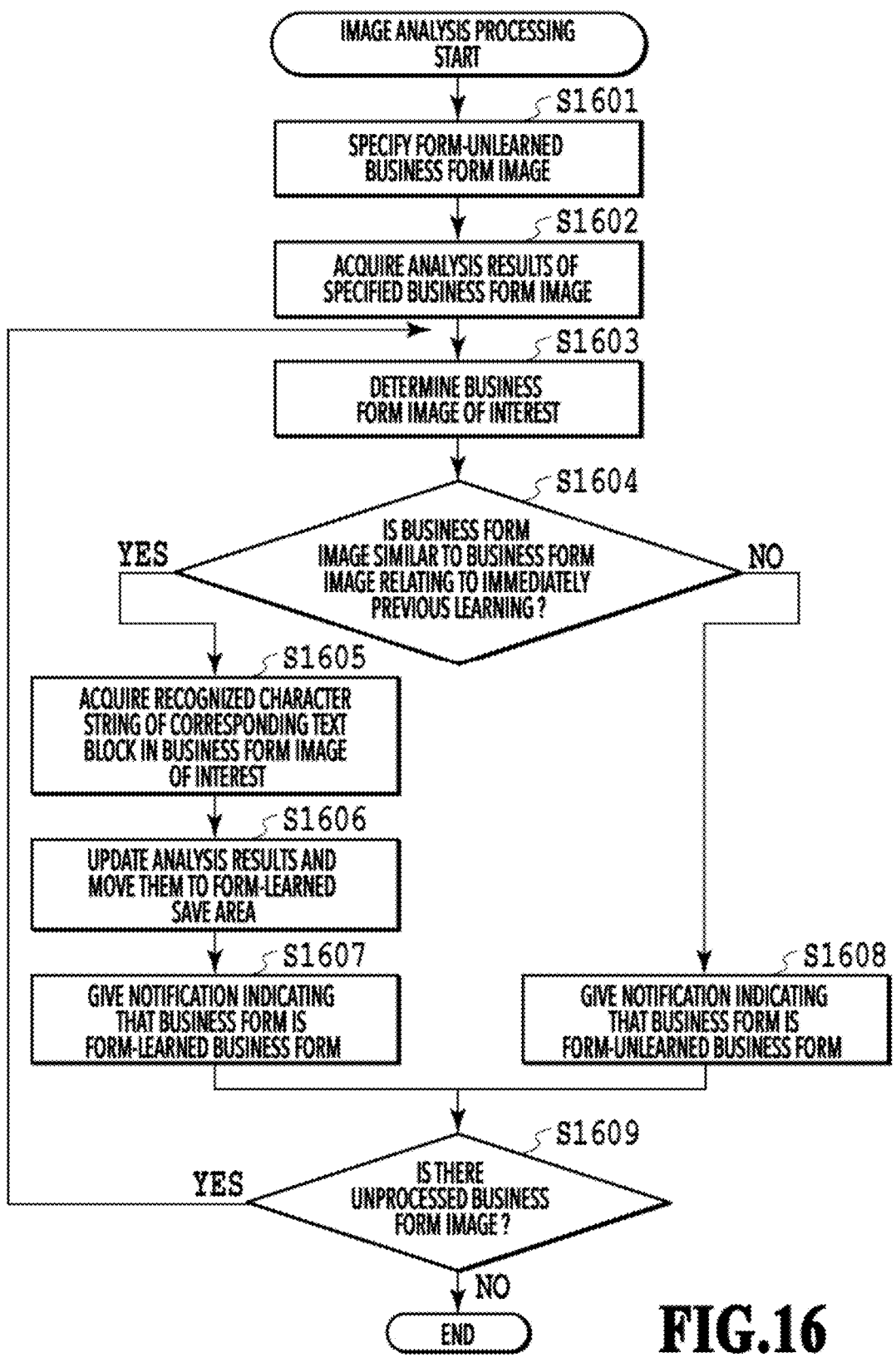
FIG. 16 is a flowchart showing details of learning results reflection processing according to Case 1.

Here, a flow of specific processing is explained on the assumption that a plurality of business form images determined to be a business form in a new form exists in Already-scanned business form list and a user has set a file name to an arbitrary business form image among them. FIG. 16 is a flowchart showing details of the learning results reflection processing according to this case. In the following, explanation is given along the flowchart in FIG. 16.

First, at S1601, among the business form images described in Already-scanned business form list, the business form image determined to be form unlearned in the business form determination processing is specified. The business form image whose "Status" in the business form list area 1001 is "unlearned" on the Storage save screen 1000 shown in FIG. 10 described previously is specified. Next, at S1602, the analysis results for the business form image specified at S1601 are acquired. In a case of the present embodiment, the analysis results stored in the save area 1403 shown in FIG. 14 described previously are acquired.

Then, at S1603, among the form-unlearned business form images whose analysis results are acquired at S1602, a business form image of interest is determined. At S1604 that follows, for the analysis results of the business form image of interest determined at S1603, collation using the most recent learning data including the analysis results of the target business form image for which learning has been performed immediately before this flow is performed. That is, whether or not the target business form image for which learning has been performed immediately previously and the business form image of interest are similar to each other is determined. In a case where the determination results indicate that both are similar, the processing advances to S1605 and in a case where both are not similar, the processing advances to S1608.

At S1605, among all the text blocks detected from the business form image of interest, the recognized character string of the text block corresponding to the text block of the character string used for a file name in the target business form image is acquired. At this time, it may also be possible to extract the recognized character string by performing the OCR processing for the corresponding text block, but for the business form image of interest, the recognized character strings of all the text blocks have already been extracted at S1308 described previously, and therefore, it is sufficient to acquire corresponding one therefrom.

Next, at S1606, the analysis results for the business form image of interest are updated and the updated analysis results are moved to the form-learned save area. That is, as the business form image similar to the target business form image, a new form-learned save area is prepared and the updated analysis results are stored therein. The reason is that the business form for which no similar business form exists at the time of the business form determination at S508 becomes a business form for which a similar business form exists at this point in time. Then, at S1607, a notification indicating that the business form image of interest has changed into a format-learned business form is sent from the image processing unit 432 to the request control unit 431. Further, in a case where it is determined that the business form image of interest is not similar to the target business form image, at S1608, a notification indicating that the state has not changed from the state of the form-unlearned business form is sent from the image processing unit 432 to the request control unit 431.

Then, at S1609, whether or not the comparison with the target business form image is completed for all the business form images whose analysis results have been acquired at S1602 is determined. In a case where there is an unprocessed business form image, the processing returns to S1603, and the next business form image of interest is determined and the processing is continued, and in a case where there is no unprocessed business form image, this processing is terminated.

The Storage save screen 1000 shown in FIG. 17 shows a state after the Storage save screen shown in FIG. 10 described previously is updated in view of the results of the learning results reflection processing described above. In the state before updating shown in FIG. 10, Business form IDs corresponding to the five already-scanned business forms are displayed and Status of "001", "002", and "004" among them is "unlearned". Here, it is assumed that a user selects the business form whose Business form ID is "001" and presses down the Edit button 1003 and then sets a file name by touching the portions of the character strings "Estimate form" and "Shinagawa Inc." within the preview area 1102 on the File name setting screen 1100 in FIG. 11. Due to this, the File name setting screen 1100 enters the state shown in FIG. 12 described previously and in the file name input field 1101, a file name of "Estimate form_Shinagawa Inc." is displayed. After that, it is assumed that the input information at the time of the file name setting is learned by a user pressing down the OK button 1107 and immediately after that, the learning results reflection processing is performed.

Figure 18:
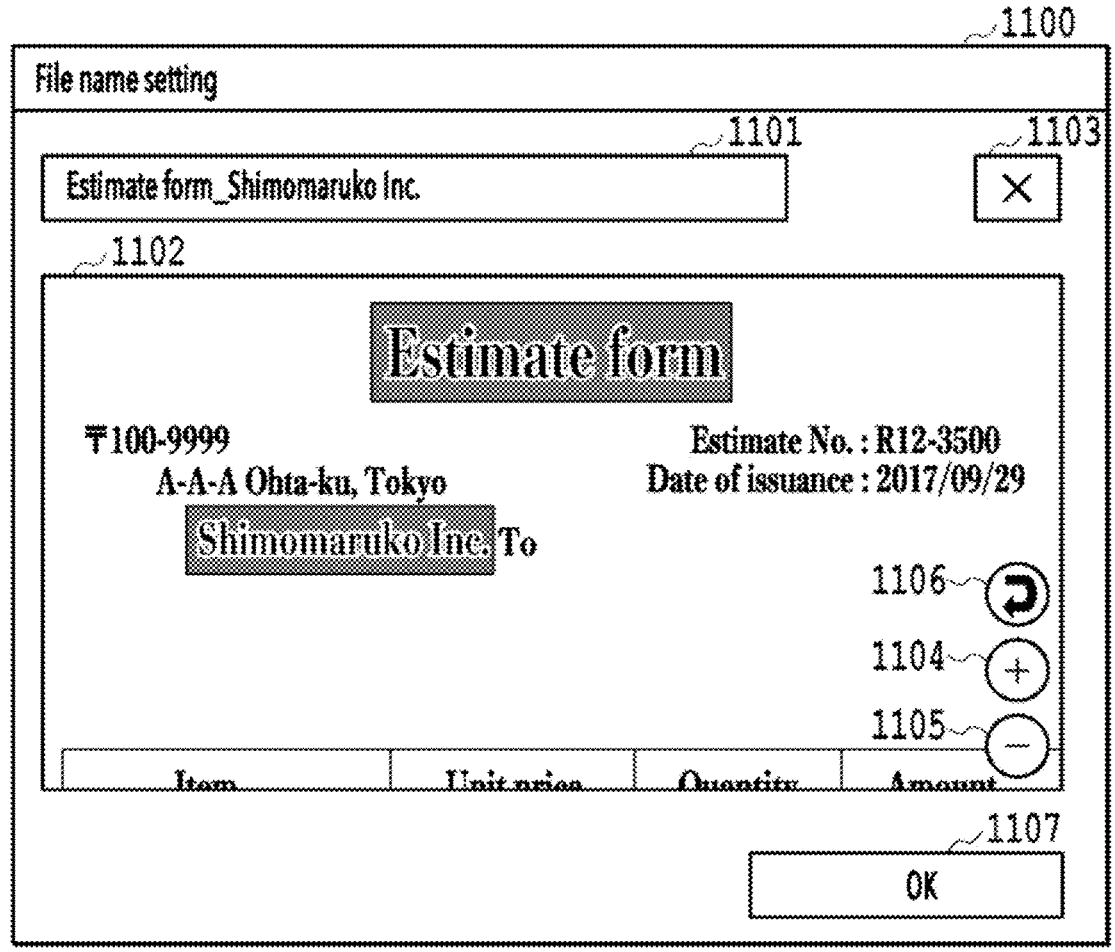
FIG. 18 is a diagram showing an example of the File name setting screen.

Here, in a case where FIG. 17 after updating and FIG. 10 before updating are compared, Status whose Business form ID is "001" and "002" has changed from "unlearned" into "learned". Then, the change in Status whose Business form ID is "001" results from a user setting a file name by a manual operation and the change in Status whose Business form ID is "002" results from the determination of similarity to the business form of "001" in the learning results reflection processing. Further, as to Type also, a change into the same contents has occurred for "001" and "002", and therefore, it is known that these are business forms similar to each other. Then, in a case where a user selects the business form whose Business form ID is "002" and presses down the Edit button 1003 on the updated Storage save screen 1000 shown FIG. 17, the state makes a transition into the state shown in FIG. 18. The scanned image whose Business form ID is "002" is shown in FIG. 19, which is the source of the preview image being displayed in the preview area 1102 on the File name setting screen 1100 shown in FIG. 18. On the File name setting screen 1100 shown in FIG. 18, at the point in time of being displayed, "Estimate form_Shimomaruko Inc." is already input in the file name input field 1101. This results from that the learning results of the file name setting performed for the business form whose Business form ID is "001" by the learning results reflection processing are applied to the business form whose Business form ID is "002". For the business form whose Business form ID is "004", Status has not changed and remains "unlearned". This results from that it is determined that the business form is not similar to the business form whose Business form ID is "001" in the learning results reflection processing.

In the manner described above, it is possible to reflect the results of performing learning for a new business form in another unlearned business form within Already-scanned business form list. Due to this, it is possible to save time and effort to perform learning individually for another unlearned business form scanned en bloc and having the same the business form. Further, the learning results reflection processing is performed immediately after the learning for the new business form is performed, and therefore, it is made possible to immediately present the most recent learning results to a user. Furthermore, at the time of the learning results reflection processing, all the image analysis results for each business form scanned en bloc are acquired by one-time access, and therefore, the more the business forms are dealt with, the larger the effect of the reduction in the processing time is.

«Case 2»

Figure 20:
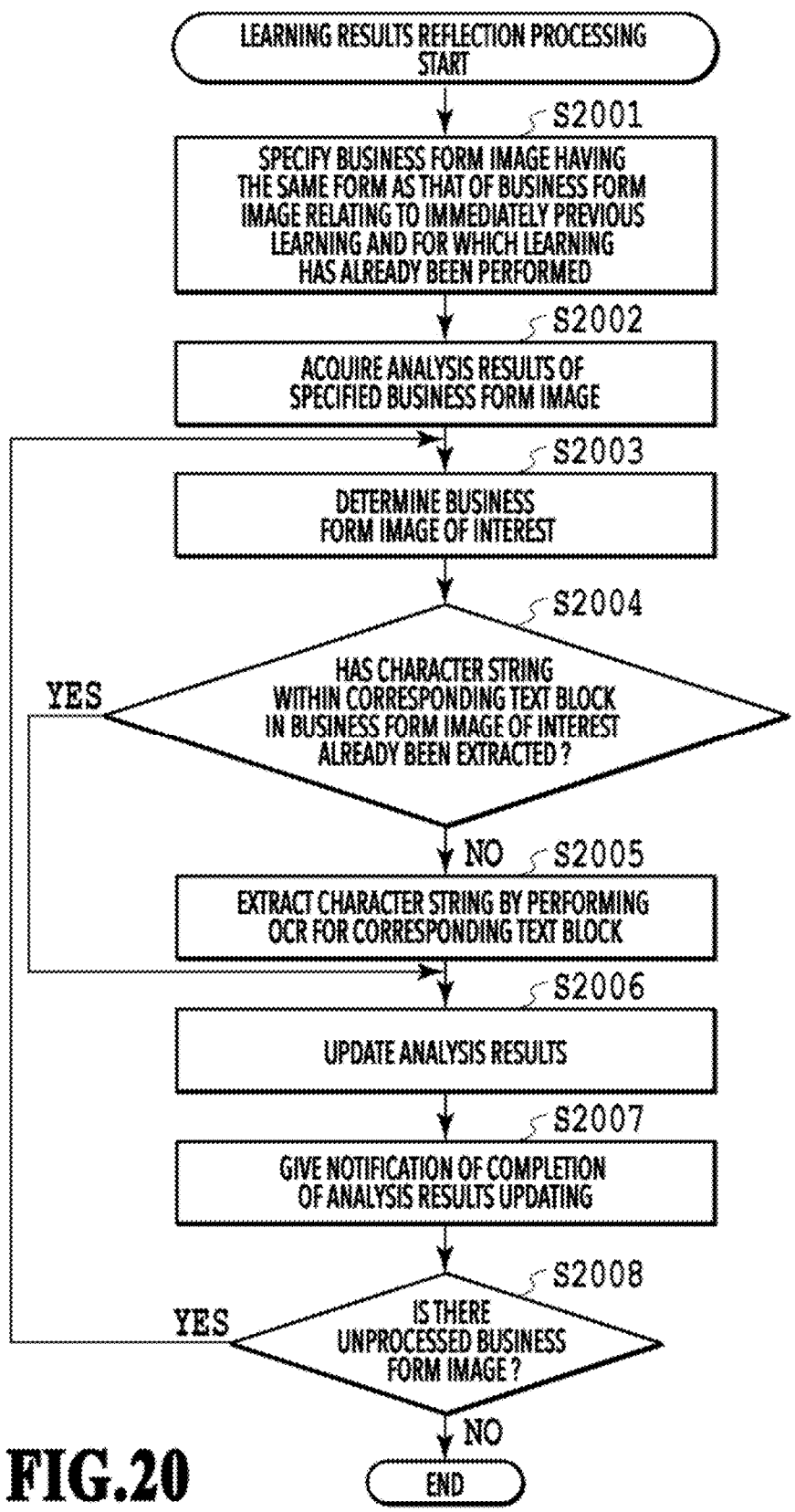
FIG. 20 is a flowchart showing details of learning results reflection processing according to Case 2.
Figure 22A:
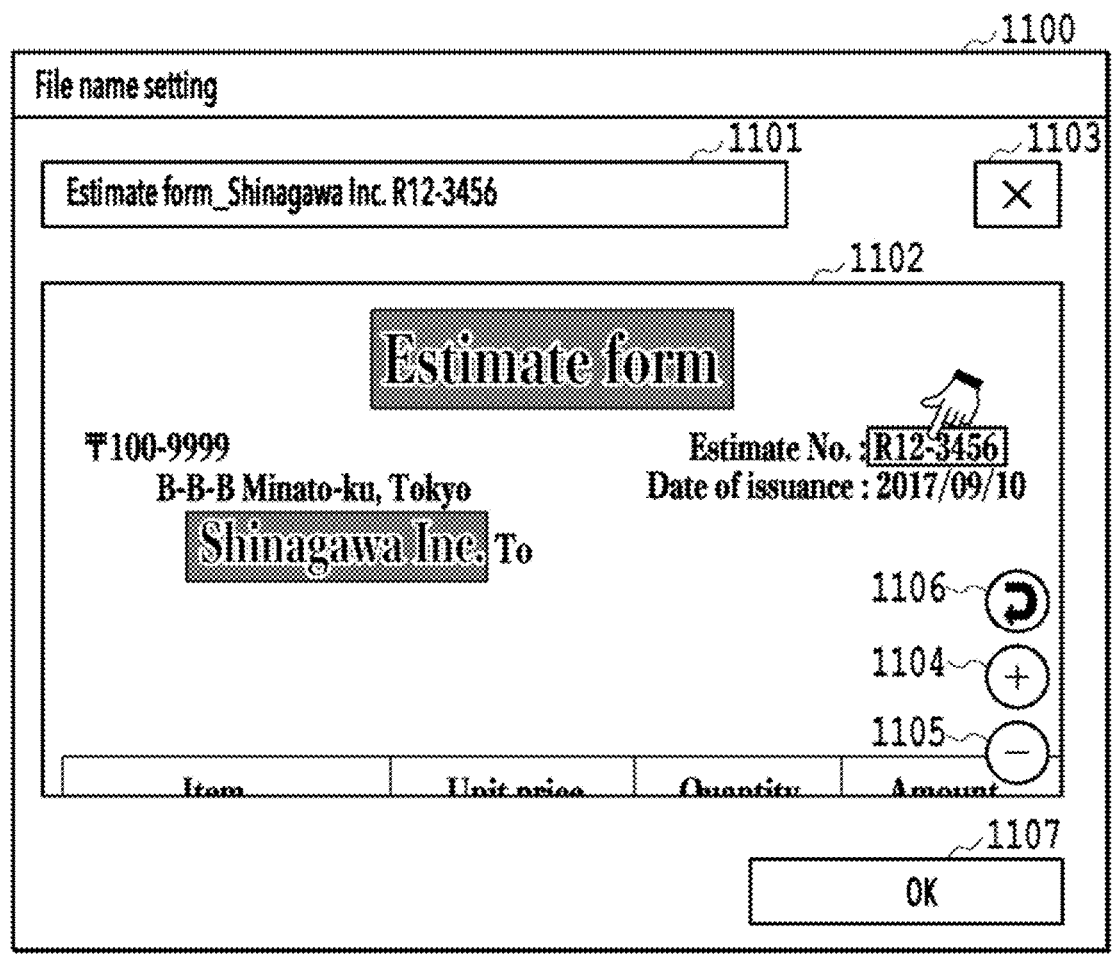

Next, a flow of specific processing is explained on the assumption that in a case where there exists a plurality of business forms similar to one another and whose Status is "learned" in Already-scanned business form list, a user has corrected a file name for one of the business forms. FIG. 20 is a flowchart showing details of learning results reflection processing according to this case. Further, FIG. 21 is a diagram showing an example of the Storage save screen before the execution of the learning results reflection processing in this case. Here, as already-scanned business forms, five business forms are registered and Status of the business forms among the five business forms, whose Business form ID is "001", "002", "003", and "005", is "learned". It is assumed that a user selects the business form whose Business form ID is "001" and presses down the Edit button 1003 in this state and the File name setting screen 1100 shown in FIG. 12 is displayed. At this time, in the preview image within the preview area 1102, the text blocks of "Estimate form" and "Shinagawa Inc." are highlighted and in the file name input field 1101, the characters of "Estimate form_Shinagawa Inc.", which is the current file name, are displayed. After that, the user touches the character portion of "R12-3456" as shown in FIG. 22A. Due to this, the display of the file name input field 1101 is changed into "Estimate form_Shinagawa Inc._R12-3456". After that, in a case where the user presses down the OK button 1107, the file name is updated to the displayed contents and following that, the execution of the flow shown in FIG. 20 is started.

First, at S2001, among the business form images described in Already-scanned business form list, a business form image is specified which has the business form identical or similar to the business form of the business form image relating to the immediately previous learning and which is determined to be form learned in the business form determination processing. Here, Business form ID of the business form image relating to the immediately previous learning is "001" and whose Type is "estimate form CCC" (refer to FIG. 21). Consequently, two business form images whose Type is the same "estimate form CCC" and whose Status is "learned", that is, the business form images whose Business form ID is "002" and "005" are specified. Next, at S2002, the analysis results of the business form images specified at S2001 are acquired.

Then, at S2003, among the business form images whose analysis results are acquired at S2002, the business form image of interest is determined. At S2004 that follows, whether the character string of the text block in the business form image of interest determined at S2002, which corresponds to the text block in the target business form image for which learning has been performed immediately before this processing, is already extracted is determined. For example, in a case where the contents of the editing performed by a user are deletion of a part of the character string used as the file name, the information on the corrected character string used as the file name is already included within the data on each business form stored as learning data and already acquired. However, in a case where the contents of the editing are addition of a character string used as the file name, the information on the character string of the text block, which corresponds to the added character string in the business form image of interest, is not included within the data on each business form stored as learning data, and therefore, it is necessary to extract the information anew. Consequently, at this step, whether or not the character string of the corresponding text block is already extracted is determined. In a case where the OCR processing for the corresponding text block is completed and the recognized character string of each text block is already extracted, the processing advances to S2006 and in a case where the character string is not extracted yet, the processing advances to S2005.

At S2005, the OCR processing is performed for the corresponding text block in the business form image of interest and the character string is extracted. Then, at S2006 that follows, the analysis results of the business form image of interest are updated. Specifically, for the text block in the business form image of interest and the information indicating the recognized character string thereof (information on "rect" and "text" within "regions" described above), deletion or addition in accordance with the contents of the editing for the target business form image relating to the immediately previous learning is performed. Status of the business form image of interest at this time does not change and remains "learned", and therefore, the movement of the save area is not performed.

Then, at S2006, a notification to the effect that updating of the analysis results of the business form image of interest is completed is given from the image processing unit 432 to the request control unit 431. After that, at S2008, whether or not the comparison with the target business form image is completed for all the business form images whose analysis results are acquired at S2002 is determined. In a case where there is an unprocessed business form image, the processing returns to S2003, and the next business form image of interest is determined and the processing is continued, and in a case where there is no unprocessed business form image, this processing is terminated.

Figure 22B:
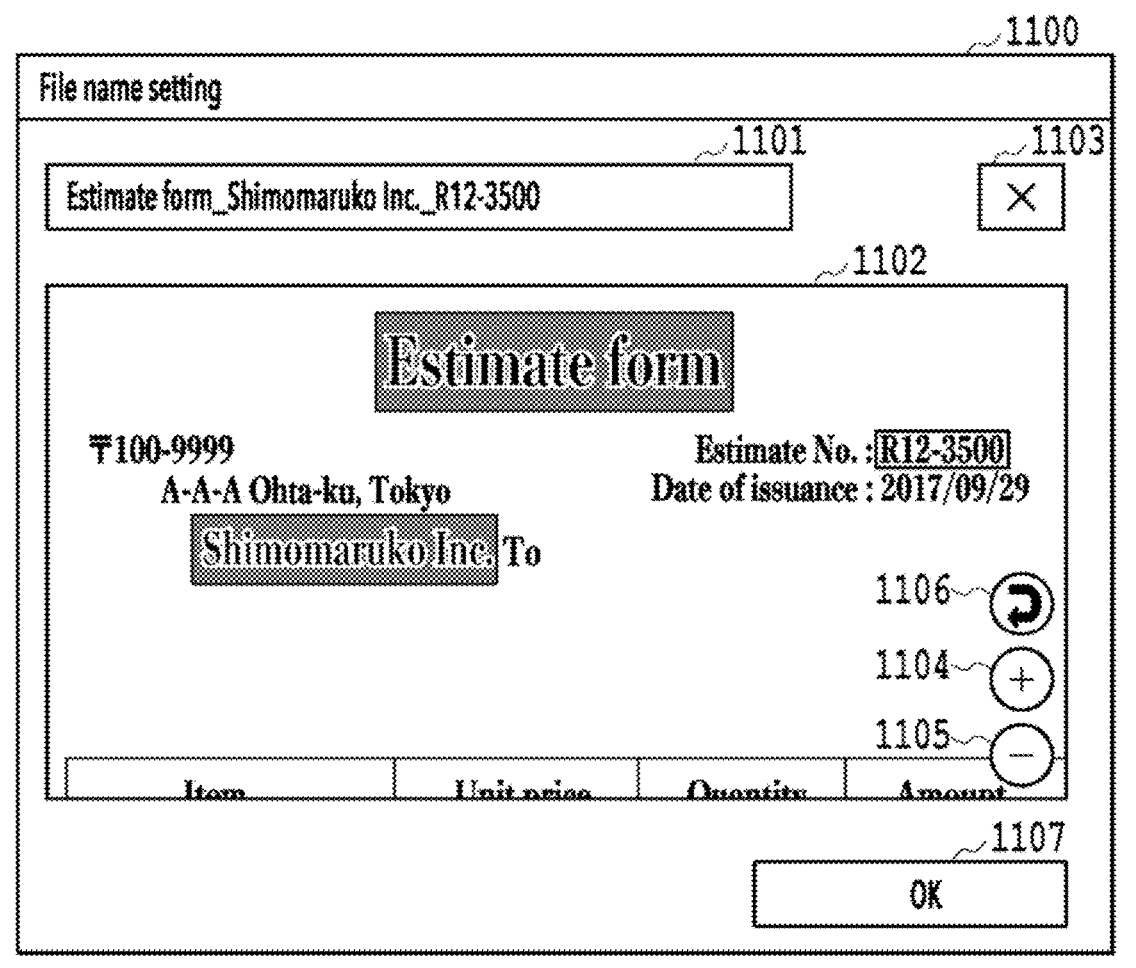

It is assumed that after the learning results reflection processing explained above is completed, a user selects the business form image whose Business form ID is "002" on the Storage save screen 1000 shown in FIG. 21 and presses down the Edit button 1003. FIG. 22B shows an example of the File name setting screen 1100 that is displayed at this time. Status of the business form image whose Business form ID is "002" is "learned" and the business form image is similar to the business form image whose Business form ID is "001". Because of this, at the point in time at which the File name setting screen 1100 is displayed, "Estimate form_Shimomaruko Inc._R12-3500", which is the file name based on the file name setting rule of the business form image whose Business form ID is "001" after the above-described updating, is displayed in the file name input field 1101. Further, in the preview area 1102 also, the portion of the text block of the character string "R12-3500" is highlighted so that it is known that this is selected as the file name.

As described above, it is possible to immediately reflect the results of the relearning also in a case where the editing of the file name is performed for the learned business form for another similar learned business form within Already-scanned business form list. Due to this, it is possible to save time and effort to individually perform relearning for another learned business form scanned en bloc and having the same business form. Further, the learning results reflection processing is performed immediately after relearning is performed for the learned business form, and therefore, it is made possible to immediately present the most recent learning results to a user. Furthermore, at the time of the learning results reflection processing, all the image analysis results for each business form scanned en bloc are acquired by one-time access, and therefore, the more the business forms are dealt with, the larger the effect of the reduction in the processing time is.

Modification Example 1

In both the cases of Case 1 and Case 2 described above, the learning results reflection processing is performed for all the business form images that satisfy the predetermined condition, which exist in Already-scanned business form list. However, it is not necessary to reflect the learning results in the business form image already checked by a user and there is a possibility that reflecting the learning results uniformly will cause trouble, such as that the file name is changed into a file name not intended by a user. Consequently, it is possible to exclude the business form image already checked by a user from the target of the learning results reflection processing described above. Specifically, in a case where a predetermined situation is detected for a specific business form image within Already-scanned business form list, information (for example, flag or the like) indicating that check is already performed to the business form image. Then, the business form image for which it is indicated that check is already performed by a flag or the like is excluded from the target of the learning results reflection processing described above. At this time, it may also be possible to enable a user to visually recognize which business form is already checked by further providing an item of "Check state" as in a business form list area 1001' on a Storage save screen 1000' shown in FIG. 23. Further, it may also be possible to indicate whether check is already performed by providing, in place of the indication by characters, an icon indicating the check situation, changing the background color of each row, providing a dedicated checkbox, and so on.

Here, as the predetermined situation indicating that check by a user is already performed, for example, the following cases are considered.

A case where user selection for an arbitrary text block within the preview image is detected A case where correction for a character string displayed in the file name input field 1101 is detected A case where a predetermined time elapses with the state where the same preview image is displayed being unchanged A case where pressing down of the OK button 1107 or a dedicated checked button (not shown schematically) is detected Then, it is sufficient to perform the detection of the predetermined situation described above repeatedly at predetermined intervals while the File name setting screen 1100 is being displayed. In a case where the above-described predetermined situation is detected at S512 described previously in the state where the File setting screen is being displayed, the MFP 110 notifies the MPF cooperative server 120 of the detection of the predetermined situation as well as processID of the business form image thereof. Then, it is sufficient for the data management unit 434 of the MFP cooperative server 120 to save and manage the business form image of processID relating to the notification as that already checked.

Modification Example 2

In the example described above, the range of the business form image displayed in Already-scanned business form list is associated with a login user. That is, what is displayed within the business form list area 1001 on the Storage save screen 1000 is only the business form image scanned by the login user him/herself. However, it may also be possible to include a business form image scanned by another user, in addition to the business form image scanned by a login user him/herself. In a case where a business form image scanned by another user is included, it is also sufficient to take the business form image as the target of the learning results reflection processing in a case where the business form image satisfies a predetermined condition.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the technique of the present disclosure, it is possible to reduce time and effort of a user at the time of computerizing a plurality of documents en bloc.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2020-007525, filed Jan. 21, 2020 which is hereby incorporated by reference wherein in its entirety.

What is claimed is:

1. An image processing system comprising:
   a memory that stores a program; and
   a processor that executes the program to perform:
   displaying a first UI screen for setting a property relating to a scanned image by using a recognized character string obtained by performing character recognition processing for the scanned image and a second UI screen that displays a list of a plurality of scanned images;
   generating learning data by registering positional information relating to a recognized character string used for setting of the property in association with a document form of the scanned image; and
   determining, in a case where the learning data is generated in response to setting of the property being performed on the first UI screen for a first scanned image that is selected from the plurality of scanned images included in the list on the second UI screen, a scanned image having a document form similar to a document form of the first scanned image among other scanned images included in the list.

2. The image processing system according to claim 1, wherein
the processor executes the program to further perform:
displaying information indicating whether or not learning data on the document form is already generated for each scanned image included in the list on the second UI screen; and
displaying, in a case where the learning data is generated in response to setting of the property being performed on the first UI screen for the first scanned image, information indicating that the learning data is already generated for a scanned image having a document form similar to a document form of the first scanned image among other scanned images included in the list.

3. The image processing system according to claim 1, wherein
the processor executes the program to further perform:
presenting on the first UI screen, in a case where a document form of one scanned image selected from among the plurality of scanned images matches with a document form registered in the learning data, a recognized character string of a text block within the selected one scanned image as a character string used for setting of a property relating to the selected one scanned image based on the arrangement information registered in learning data on the matching document form.

4. The image processing system according to claim 3, wherein
the processor executes the program to perform:
the presenting by, in a case where a character string configuring the property on the first UI screen is added to one scanned image selected from among the plurality of scanned images included in the list on the second UI screen and a character string of a text block in the selected one scanned image, which corresponds to a text block of the added character string, is not extracted yet, extracting a character string by performing OCR processing for the text block and using the extracted character string.

5. The image processing system according to claim 1, wherein
for a scanned image already checked by a user among the plurality of scanned images included in the list, the determining whether or not the scanned image is a scanned image having a document form similar to a document form of the first scanned image is not performed.

6. The image processing system according to claim 5, wherein
the second UI screen further displays information indicating whether or not each of the plurality of scanned images included in the list is already checked by a user.

7. The image processing system according to claim 5, wherein
the scanned image already checked by a user is a scanned image for which a predetermined situation is detected on the first UI screen.

8. The image processing system according to claim 7, wherein
the case where the predetermined situation is detected is a case where user selection for an arbitrary text block of a scanned image preview-displayed on the first UI screen is detected.

9. The image processing system according to claim 7, wherein
the case where the predetermined situation is detected is a case where correction for a character string displayed in a predetermined input field on the first UI screen is detected.

10. The image processing system according to claim 7, wherein
the case where the predetermined situation is detected is a case where a predetermined time elapses with a state where an identical preview image is displayed on the first UI screen being unchanged.

11. The image processing system according to claim 7, wherein
the case where the predetermined situation is detected is a case where an operation of a predetermined button indicating that a scanned image is checked on the first UI screen is detected.

12. The image processing system according to claim 1, wherein
the property is a file name that is attached in a case where the scanned image is filed.

13. A control method of an image processing system, wherein
the image processing system comprises an interface that displays a first UI screen for setting a property relating to a scanned image by using a recognized character string obtained by performing character recognition processing for the scanned image and a second UI screen that displays a list of a plurality of scanned images and
the control method comprising:
generating learning data by registering positional information relating to a recognized character string used for setting of the property in association with a document form of the scanned image; and
determining, in a case where the learning data is generated in response to setting of the property being performed on the first UI screen for a first scanned image that is selected from the plurality of scanned images included in the list on the second UI screen, a scanned image having a document form similar to a document form of the first scanned image generated among other scanned images included in the list.

14. A non-transitory computer readable storage medium storing a program for causing a computer to perform:
displaying a first UI screen for setting a property relating to a scanned image by using a recognized character string obtained by performing character recognition processing for the scanned image and a second UI screen that displays a list of a plurality of scanned images;
generating learning data by registering positional information relating to a recognized character string used for setting of the property in association with a document form of the scanned image; and
determining, in a case where the learning data is generated in response to setting of the property being performed on the first UI screen for a first scanned image that is selected from the plurality of scanned images included in the list on the second UI screen, a scanned image having a document form similar to a document form of the first scanned image among other scanned images included in the list.

* * * * *